Dec. 31, 1957     G. C. KOMAREK     2,817,861
AUTOMATIC NUT TAPPING MACHINE
Filed Oct. 22, 1954     9 Sheets-Sheet 1

Inventor
George C. Komarek
By: Fred Gerlach Atty.

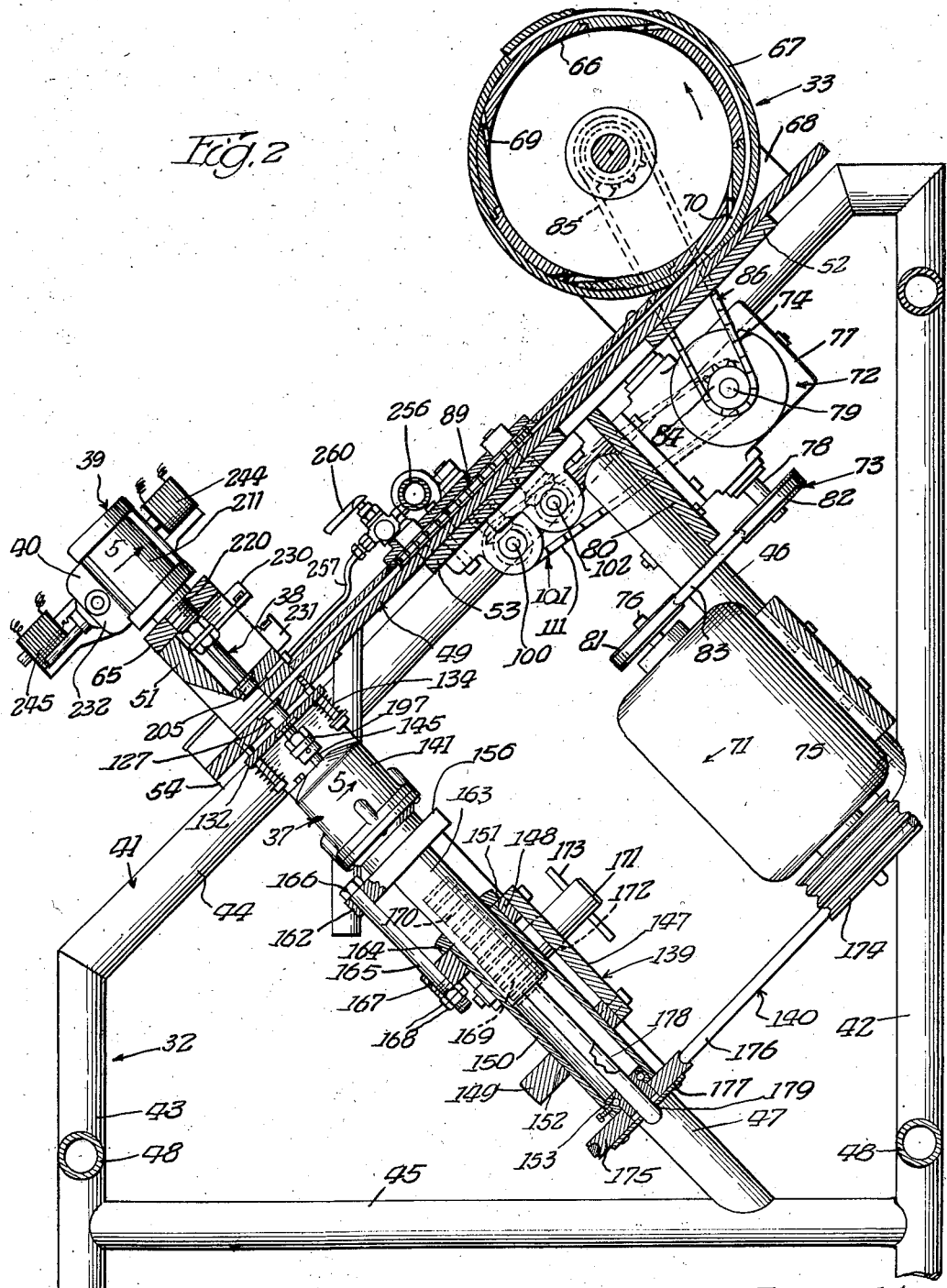

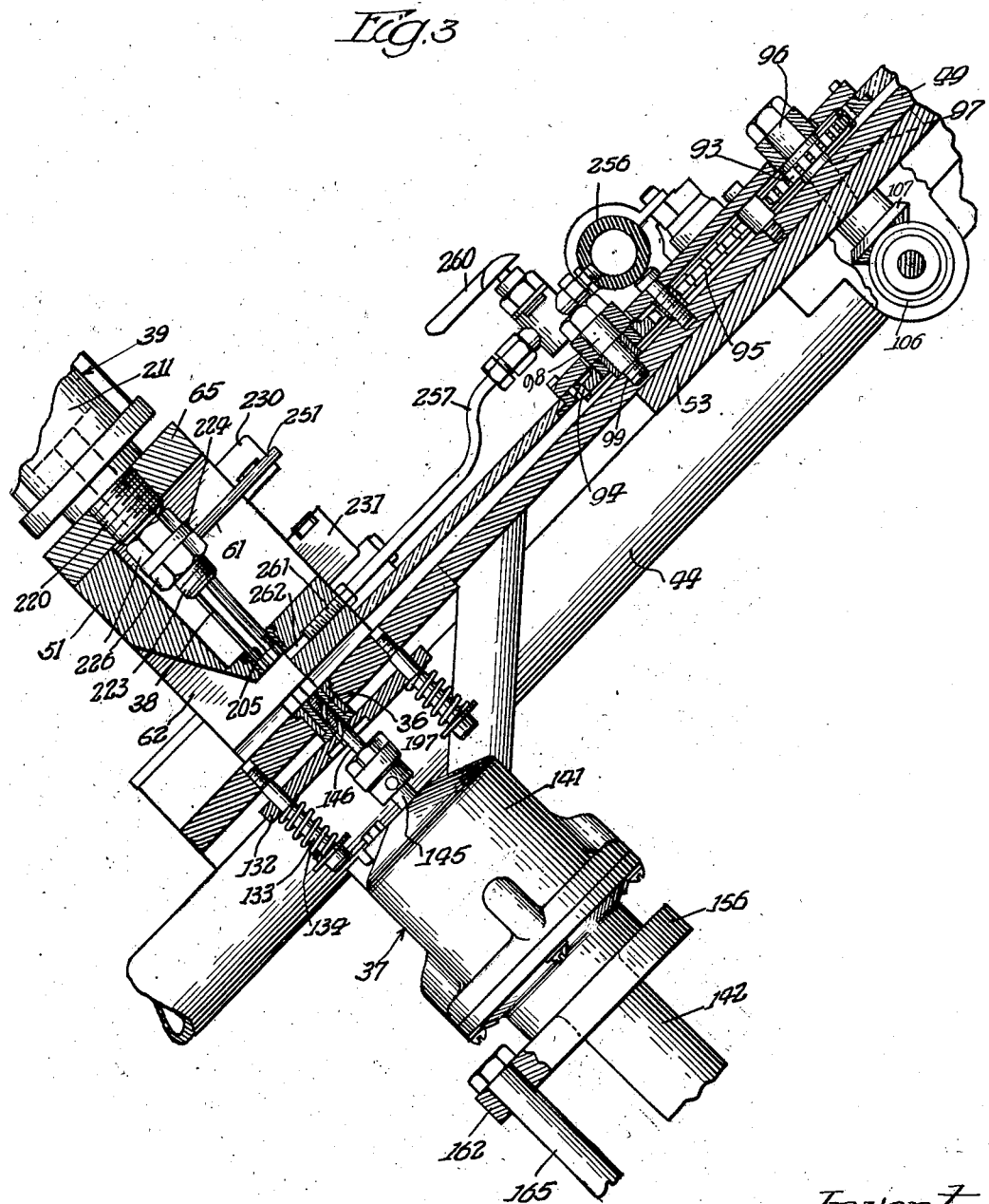

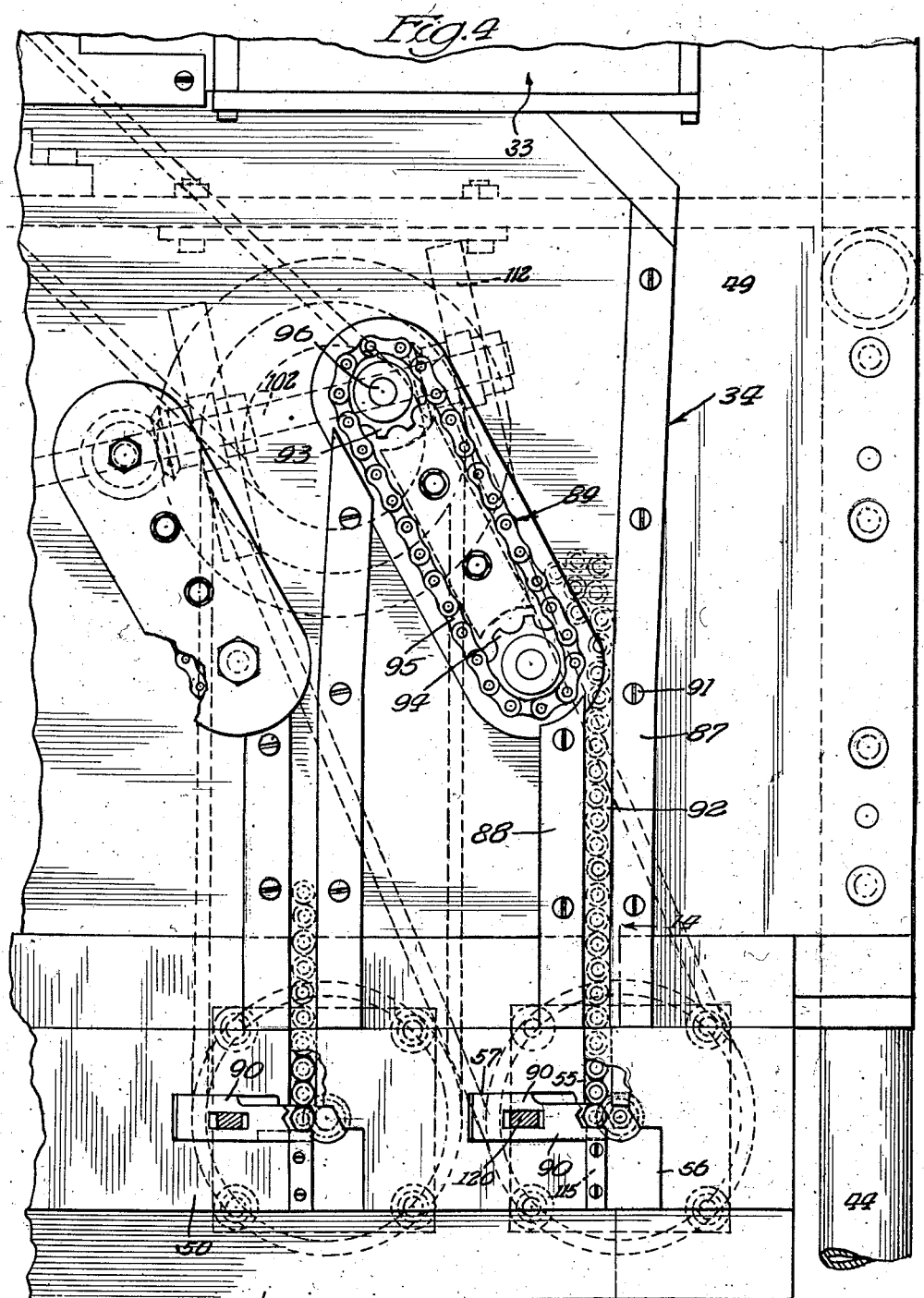

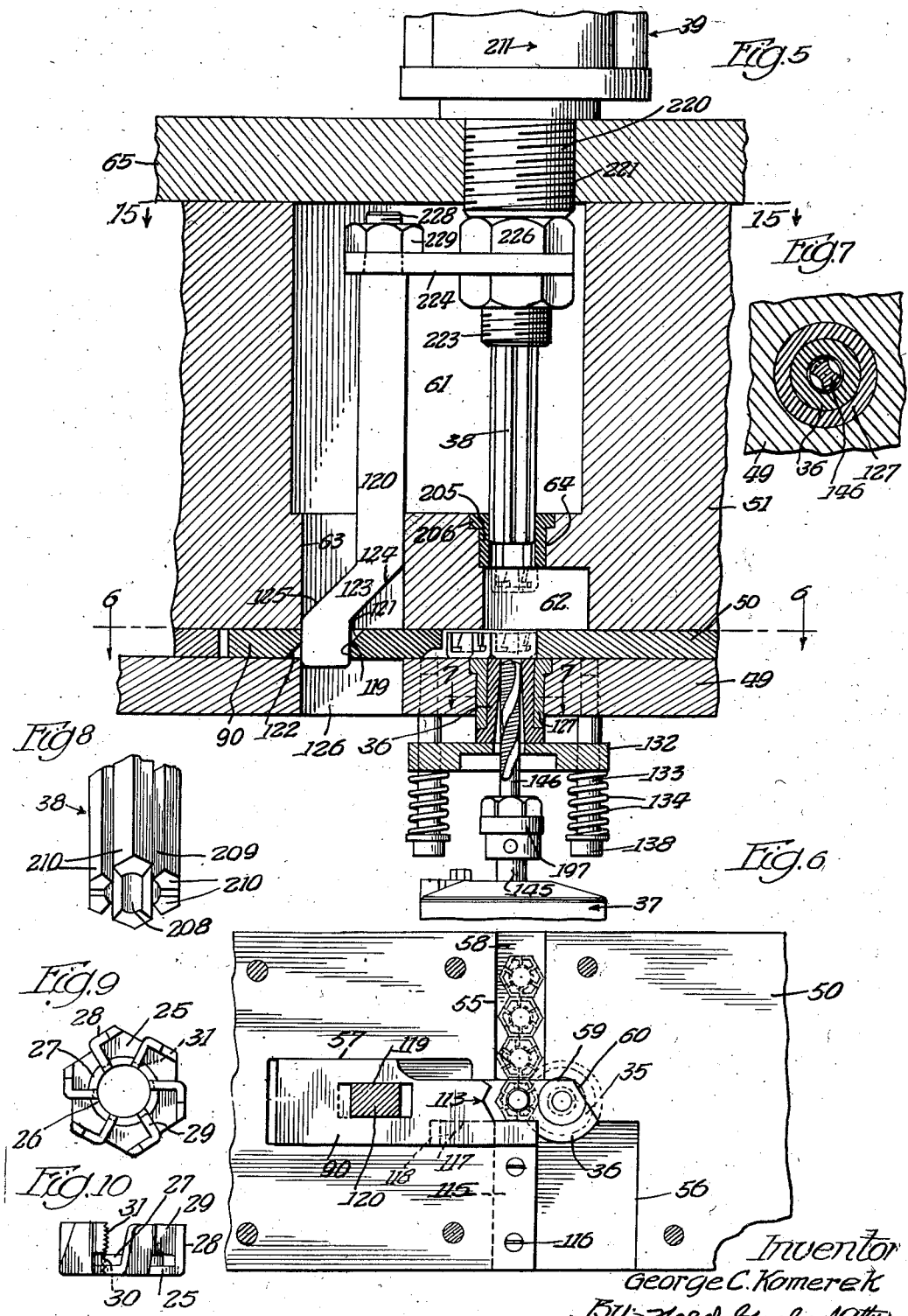

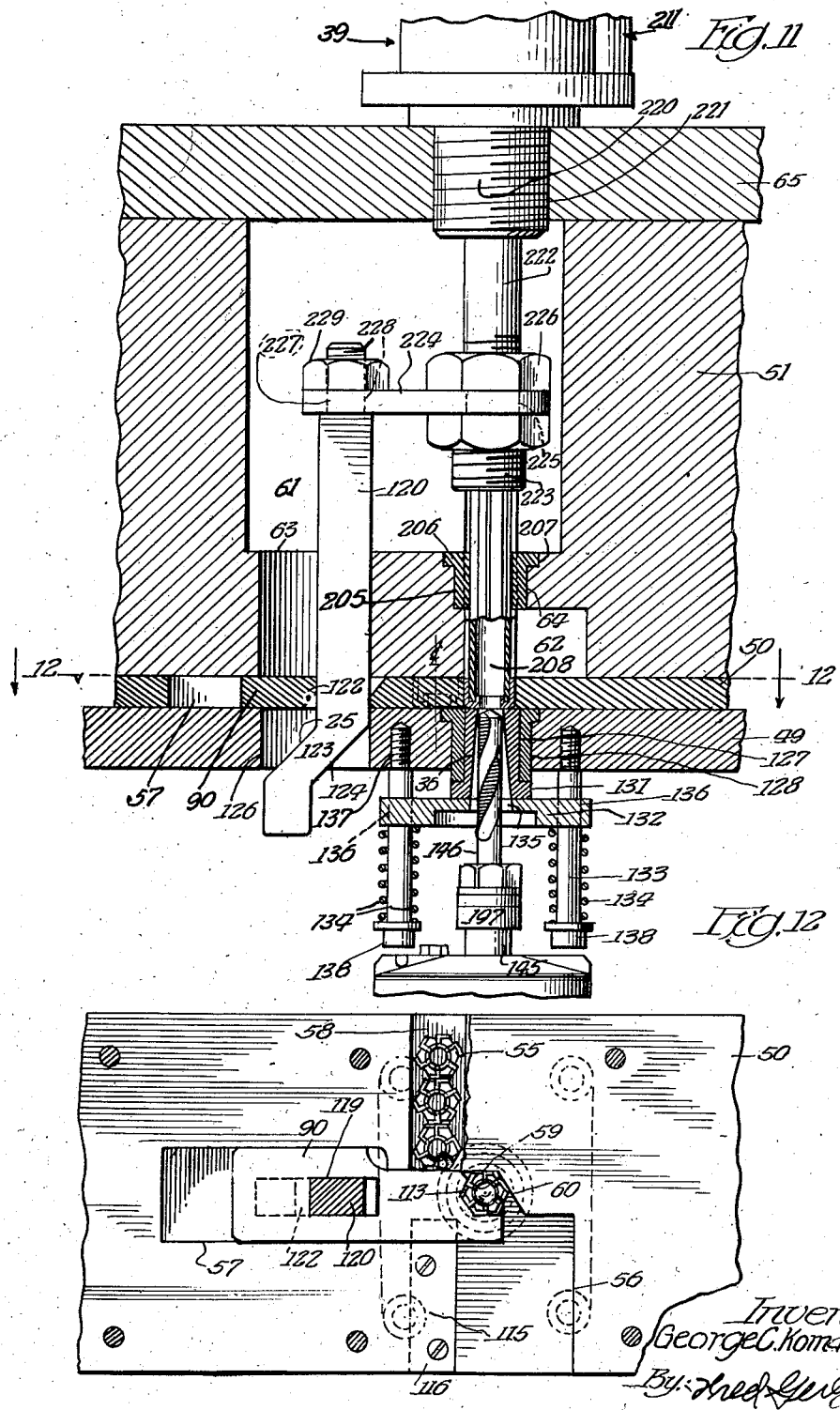

Dec. 31, 1957  G. C. KOMAREK  2,817,861
AUTOMATIC NUT TAPPING MACHINE
Filed Oct. 22, 1954  9 Sheets-Sheet 7
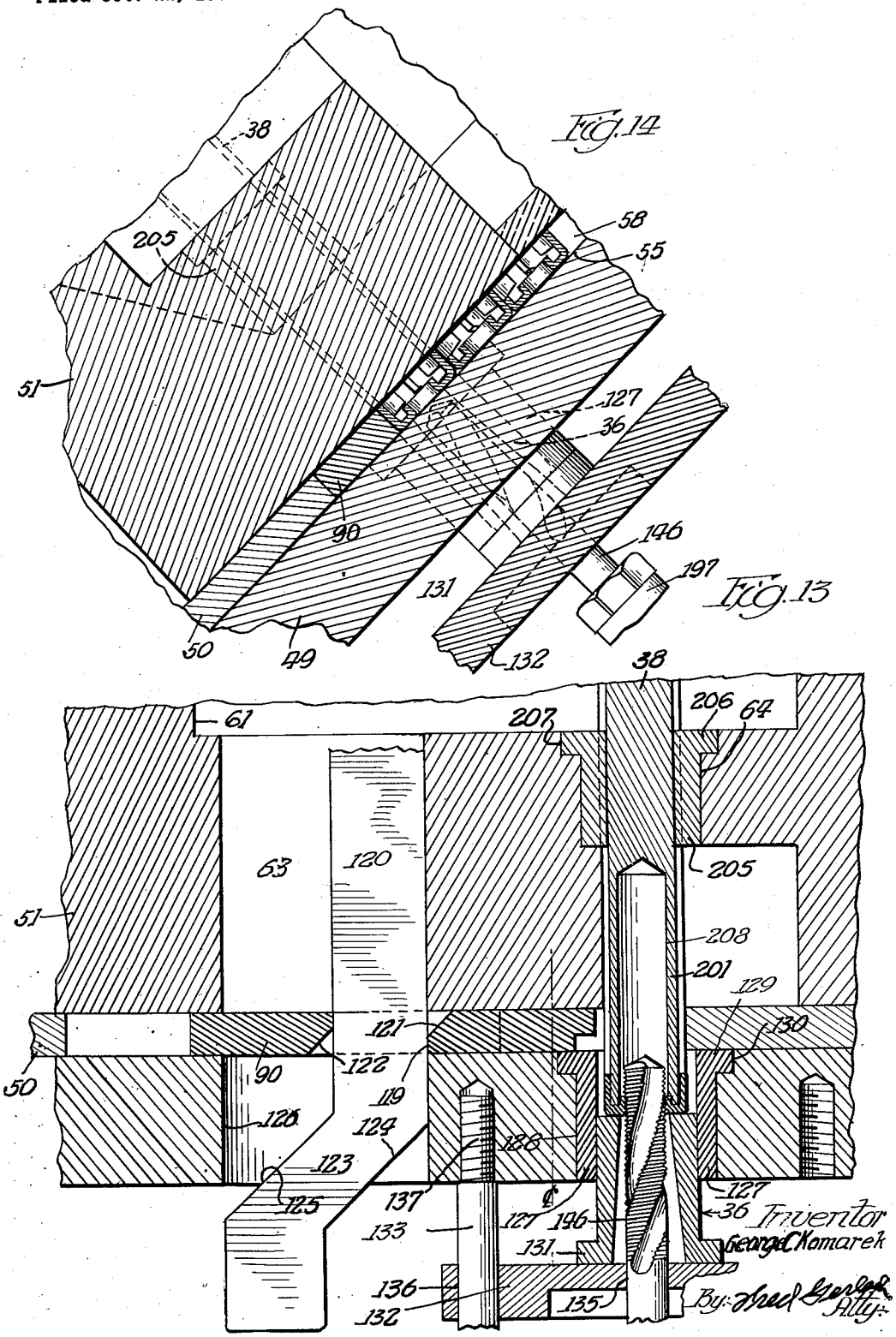

Dec. 31, 1957  G. C. KOMAREK  2,817,861
AUTOMATIC NUT TAPPING MACHINE
Filed Oct. 22, 1954  9 Sheets-Sheet 8
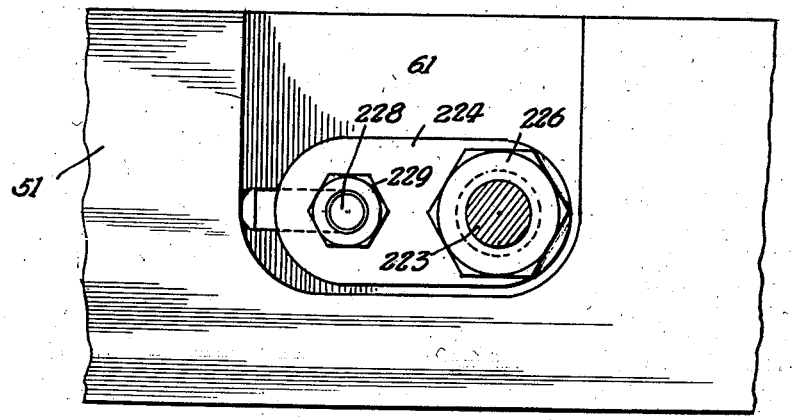
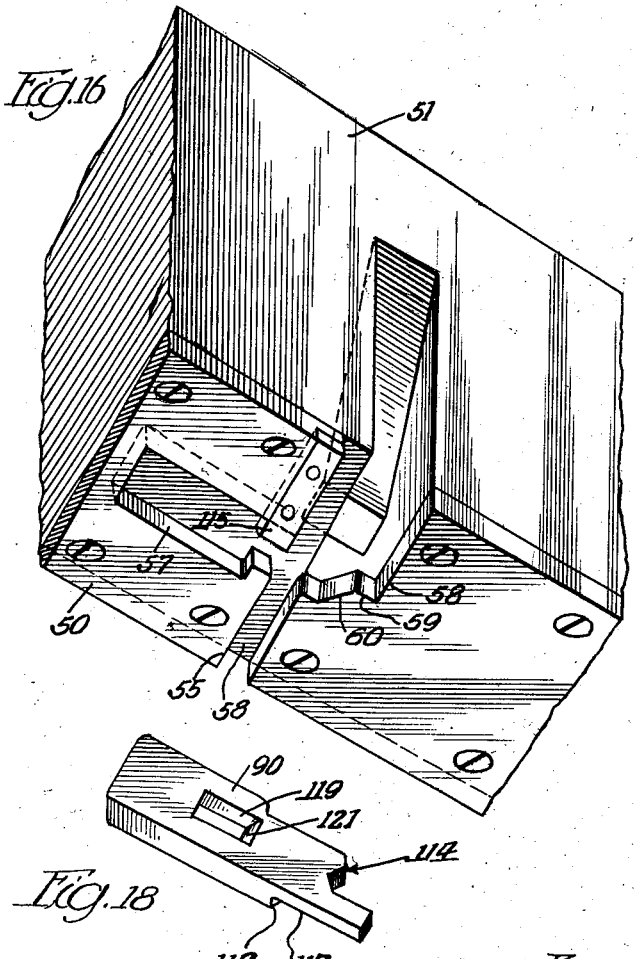
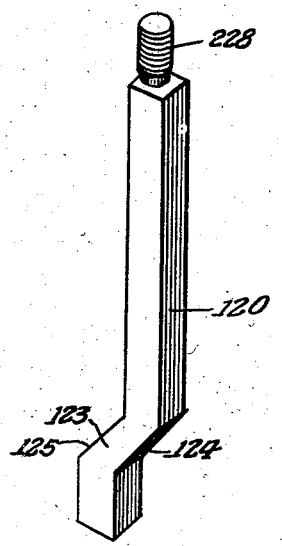
Inventor
George C. Komarek
By Fred Gerlach atty.

Dec. 31, 1957   G. C. KOMAREK   2,817,861
AUTOMATIC NUT TAPPING MACHINE
Filed Oct. 22, 1954   9 Sheets-Sheet 9
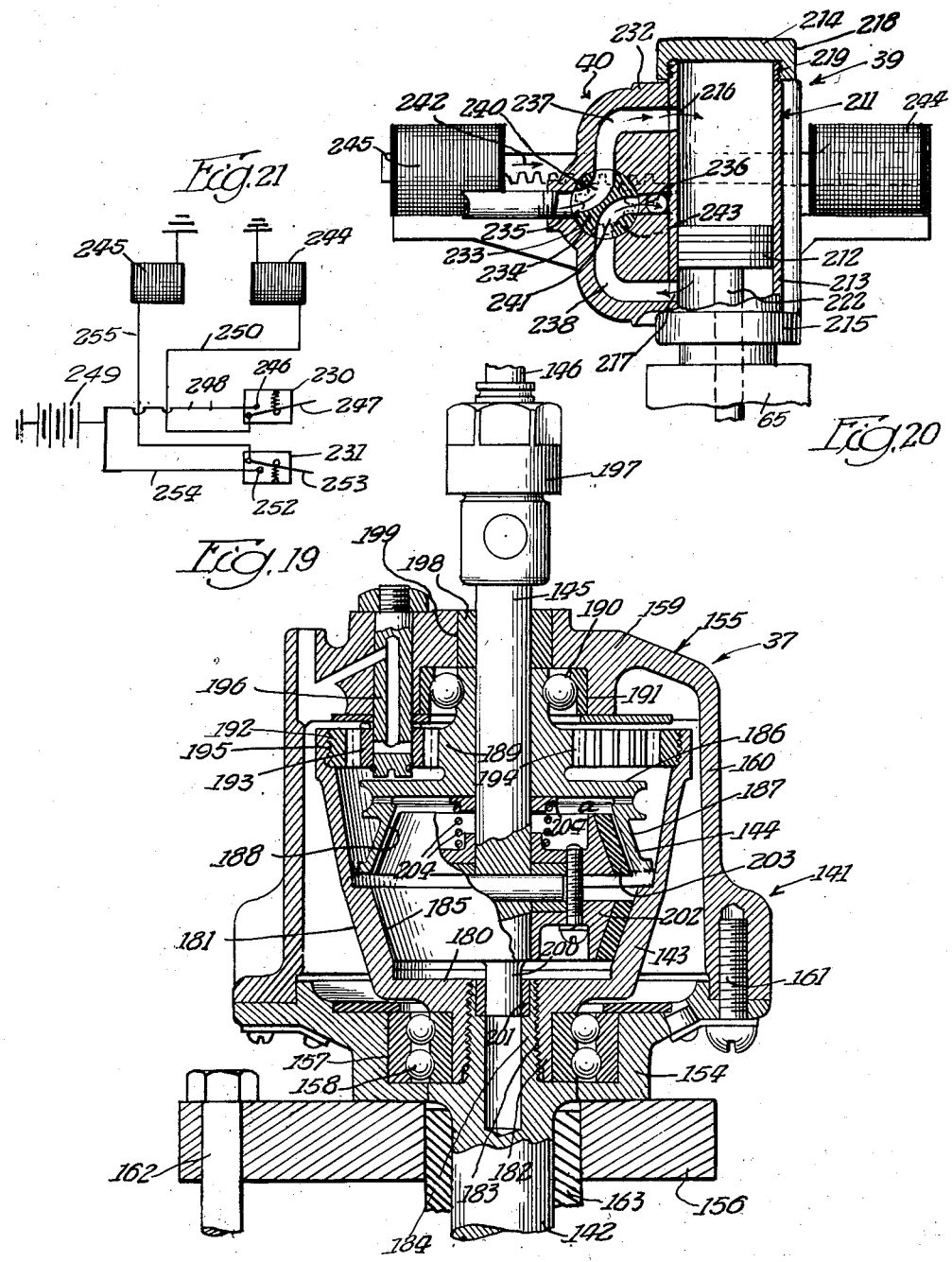
Inventor:
George C. Komarek
By: Fred Gerlach, Atty.

United States Patent Office 2,817,861
Patented Dec. 31, 1957

2,817,861

AUTOMATIC NUT TAPPING MACHINE

George C. Komarek, Brookfield, Ill., assignor to Thompson-Bremer & Co., Chicago, Ill., a corporation of Illinois Application October 22, 1954, Serial No. 463,969

8 Claims. (Cl. 10—129)

The present invention relates generally to tapping machines. More particularly, the invention relates to that variety of tapping machine which is designed primarily for use in connection with the fabrication or production of stamped metal self-locking nuts of the type that is disclosed in, and forms the subject matter of, United States Patent No. 2,294,059 and comprises a substantially flat polygonal base with a central circular hole therein, a comparatively short cylindrical internally threaded sleeve which is connected to, and projects in one direction from, the hole defining portion of the base, a series of right angle flanges which are connected to certain portions of the side margins of the base and project in the same direction as the sleeve, and a series of inwardly extending laterally flexible tongues which correspond in number to, and are associated respectively with, the flanges, have the outer ends thereof connected to certain ends of the flanges and their inner ends in lapped relation with the free end of the sleeve, are provided on their inner ends with spirally arranged teeth in phase or conformity with the internal screw thread of the sleeve, and are so angularly positioned with respect to the axis of the nut that when the nut is turned onto an externally threaded element, such as a bolt or screw, the teeth will slide freely on the screw thread of the element and when the nut is subjected to reverse or opposite turning movement, the teeth will bite into and frictionally grip the screw thread of the element and thus prevent removal of the nut from the element except by a special tool.

One object of the invention is to provide a tapping machine of the aforementioned variety which is an improvement upon, and has certain inherent advantages over, previously designed nut tapping machines and is characterized by high efficiency and speed and continuous and automatic operation.

Another object of the invention is to provide a nut tapping machine which, as its principal parts or components, comprises: (1) a rigid frame structure with means thereon forming a tapping station; (2) means for feeding the nuts to be tapped one at a time to the station and so that the bases thereof are at the bottom; (3) a tapping head which is mounted on the frame structure beneath the tapping station and embodies a rotatable tap and automatic driving mechanism whereby when a nut at the station is shifted downwards onto the tap, the tap is driven in such direction as to form the internal screw thread on the sleeve of the nut and the teeth on the inner ends of the tongues of the nut and when the nut is shifted upwards away from the tap, the tap is driven in the reverse direction; and (4) an elongated tubular anvil which is mounted above the tapping station so that it is longitudinally slidable downwards towards the tap of the tapping head and upwards away from the tap, embodies at its lower end portion an annular series of equidistantly spaced fingers which correspond in number to, and are shaped snugly to fit within, the spaces between the flanges and tongues of the nut at the tapping station, is adapted when slid downwards to move the nut onto the tap and when shifted upwards to permit removal of the tapped nut from the tap, and is further adapted because of the shape of its fingers to hold the tongues of the nut against lateral flexing during downward and upward movement of the nut with respect to the tap to the end that wear of the tap, especially in connection with upward movement of the nut after a tapping operation, is reduced to a minimum.

Another object of the invention is the provision in a nut tapping machine of the last mentioned type and character of a tubular member which is mounted at the tapping station to slide up and down in coaxial relation with the anvil and tap, embodies a spring arrangement whereby it is urged upwards against a fixed stop, extends loosely around the tap, is adapted to have the nuts to be tapped slid one at a time onto its upper end before completion of downward sliding movement of the anvil, and is further adapted when the anvil is slid downwards to slide down with the anvil and the nut and when the anvil is slid upwards to slide upwards therewith under spring pressure and until arrested by the stop in order to effect removal of the tapped nut from the tap of the tapping head.

Another object of the invention is to provide a nut tapping machine of the last mentioned character in which the means for feeding the nuts to be tapped one at a time to the tapping station comprises a slidably mounted plate which is adapted when slid in one direction to slide the first in line nut to be tapped onto the upper end of the aforementioned spring biased tubular member and when slid in the opposite direction to receive the next following nut, and has associated with it a cam arrangement whereby it is automatically slid in the said one direction during the middle part of downward sliding movement of the anvil and is slid in said other direction during the middle part of upward sliding movement of the anvil.

Another object of the invention is to provide a nut tapping machine of the last mentioned character in which the cam arrangement for effecting automatic sliding movement of the plate of the feeding means is in the form of a cam slot in the plate and a cam type bar which extends through the slot and is connected so that it moves conjointly with the anvil.

Another object of the invention is the provision in a nut tapping machine of the type and character under consideration of a novel arrangement for effecting discharge of the tapped nuts.

Another object of the invention is to provide a nut tapping machine of the aforementioned character in which the anvil is slid downwards and upwards by way of a pneumatically actuated, double acting, cylinder-piston unit under control of an electric valve.

A further object of the invention is to provide a nut tapping machine of the type under consideration in which the tapping head is mounted in a novel manner and so that it may be lowered as a unit in connection with replacement of the tap.

A still further object of the invention is to provide a nut tapping machine which is generally of new and improved construction, effectively fulfills its intended purpose, involves a compact and novel arrangement of parts, and is capable of being produced and operated at a comparatively low cost.

Other objects of the invention and the various advantages and characteristics of the present automatic nut tapping machine will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 2 is a vertical section on the line 2—2 of Figure 1;

Figure 3 is an enlarged fragmentary vertical section illustrating in detail the construction and arrangement of the tapping station, the tapping head and the anvil;

Figure 4 is an enlarged fragmentary front view showing in detail certain parts of the means for feeding the nuts to be tapped one at a time to the tapping station;

Figure 5 is an enlarged section taken on the line 5—5 of Figure 2 and showing the anvil in its fully up position and the slidable plate of the nut feeding means before it has been slid in one direction so as to slide the first in line nut to be tapped onto the upper end of the slidably mounted spring biased tubular member;

Figure 6 is a plan section on the line 6—6 of Figure 5;

Figure 7 is a section taken on the line 7—7 of Figure 5 and illustrating in detail the cross sectional construction of the tap of the tapping head and the slidably mounted spring biased tubular member which extends loosely around the tap;

Figure 8 is a fragmentary perspective of the lower end of the anvil illustrating the arrangement and cross sectional design of the fingers which correspond in number to, and are shaped snugly to fit within, the spaces between the flanges and tongues of the nuts to be tapped;

Figure 9 is a plan view of a stamped metal self-locking nut of the type that is adapted to be tapped by the machine;

Figure 10 is a side view showing the nut of Figure 9 after the sleeve and inwardly extending laterally flexible tongues have been tapped by the machine;

Figure 1:
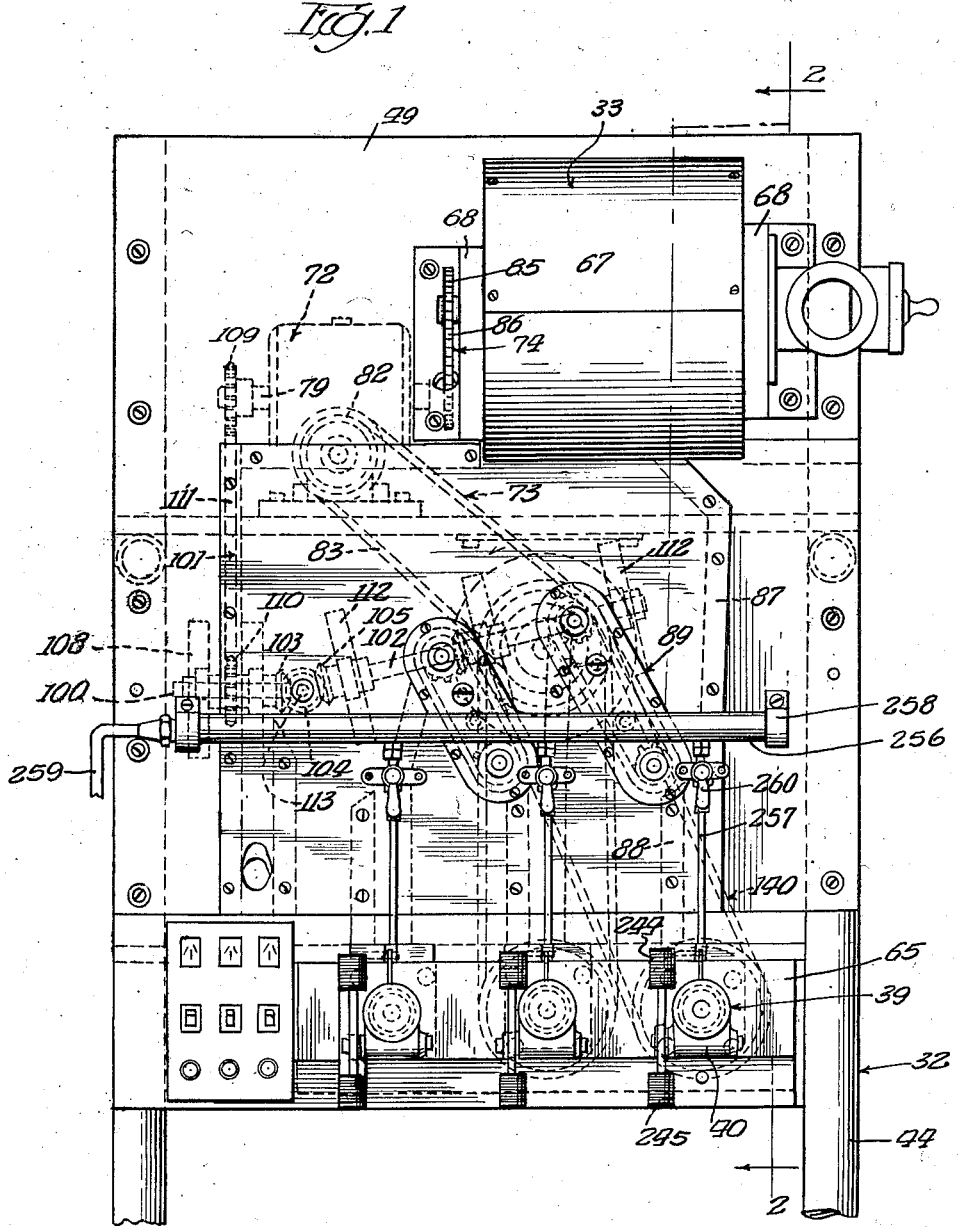
Figure 1 is a fragmentary front view of a nut tapping machine embodying the invention.

Figure 11 is an enlarged section like Figure 5 except that that it shows the slidably mounted plate of the nut feeding means after it has been slid so as to position the first in line nut over the upper end of the spring biased tubular member, and also shows the anvil after it has been slid partially downward to such an extent that the lower ends of its fingers fit snugly within the spaces between the flanges and tongues of the nut on the tubular member;

Figure 12 is a section on the line 12—12 of Figure 11;

Figure 13 is an enlarged section substantially like that of Figure 11 except that it shows the anvil in its fully down position, the nut at the tapping station in surrounding relation with the upper end of the tap of the tapping machine, and the subjacent spring biased tubular member in its depressed position;

Figure 14 is an enlarged vertical section taken on the line 14—14 of Figure 4 and showing in detail a portion of the means for feeding the nuts to be tapped one at a time to the tapping station;

Figure 15 is a section taken on the line 15—15 of Figure 5 and illustrating the manner in which the cam type bar of the cam arrangement for effecting automatic sliding movement of the nut feeding plate of the feed means is connected so that it moves conjointly with the anvil;

Figure 16 is a fragmentary bottom perspective view of the block and plate which constitute parts of the frame structure of the machine and serve to form the tapping station for the nuts;

Figure 17 is a perspective of the cam type bar which forms a part of the cam arrangement for effecting automatic back and forth sliding movement of the nut feeding plate in timed relation with the anvil;

Figure 18 is a top perspective of the nut feeding plate of the means for feeding the nuts to be tapped one at a time to the tapping station;

Figure 19 is a longitudinal section of the tapping head of the machine;

Figure 20 is a vertical section of the pneumatically actuated, double acting cylinder-piston unit for sliding the anvil downwards and upwards; and Figure 21 is a diagram of the electrical circuit for the electric valve for controlling actuation of the cylinder-piston unit.

The machine which is shown in the drawings constitutes the preferred form or embodiment of the invention. It is wholly automatic and of unitary character and serves as a medium or instrumentality for tapping stamped metal self-locking nuts of the type that is shown in Figures 9 and 10 of the drawings. The nut of Figures 9 and 10 is in the form of a one-piece plate metal stamping and comprises a hexagonal base 25 with a circular hole 26 in its central portion, a cylindrical sleeve 27, a series of flanges 28 and a series of tongues 29. The sleeve 27 is comparatively short. It is connected to, and it projects in one direction from, the hole defining portion of the base 25 and has an internal screw thread 30. The flanges 28 are six in number and are connected, respectively, the six side marginal portions of the base. They extend at right angles to the base, project in the same direction as the sleeve 27, and are of materially greater height than the sleeve. As shown in Figure 9, the flanges 28 are of less length than the side marginal portions of the base 25. The tongues 29 are six in number and are associated respectively with the flanges 28. They extend inwards, are laterally flexible, and have the outer ends thereof connected to certain ends of the flanges 28 and their inner ends in lapped relation with the free end of the sleeve 27. The inner ends of the tongues are provided with spirally arranged teeth 31 which are in phase or conformity with the internal screw thread 30 of the sleeve 27. The tongues 29 are so angularly positioned with respect to the axis of the nut that when the nut is turned onto an externally threaded element, such as a bolt or screw, the teeth will slide freely on the screw thread of the element and when the nut is subjected to reverse or opposite turning movement the teeth will bite into and frictionally grip the screw thread of the element and thus prevent or resist removal of the nut from the element. For a more detailed description of the nut of Figures 9 and 10, reference may be had to aforementioned United States Letters Patent No. 2,294,059, dated August 25, 1942. The internal screw thread 30 of the sleeve 27 and the spirally arranged teeth 31 on the inner ends of the laterally flexible tongues 29 are formed by way of the subject tapping machine as hereinafter described.

As its principal components or parts, the machine comprises a rigid frame structure 32, a unit 33 for orienting and dispensing the nuts to be tapped, means 34 for feeding the nuts to be tapped one at a time from the unit 33 to a tapping station 35, a slidably mounted, spring biased tubular member 36 at the tapping station, a tapping head 37 under the tapping station, a slidably mounted anvil 38 above the tapping head, a pneumatically actuated, double acting, cylinder-piston unit 39 for sliding the anvil downwards and upwards, and an electric valve 40 for controlling the operation of the unit 39. Whereas Figure 1 of the drawings shows the machine as comprising three side-by-side tapping heads, the machine, for purposes of simplicity, will be described as embodying but a single tapping head.

Frame structure

The frame structure 32 of the tapping machine is rigid and comprises a pair of similar laterally spaced side frames 41, each of which consists of a long vertically extending rear member 42, a short vertically extending front member 43, a diagonally extending top member 44 between the upper ends of the rear and front members 42 and 43, a horizontally extending bottom member 45 between the rear and front members, a diagonally extending upper brace member 46 and a diagonally extending lower brace member 47. Preferably, the various members of the two side frames 41 are tubular and are welded together. The two side frames are connected in spaced apart relation by horizontally extending cross members 48. Certain of the cross members extend between, and have their ends welded to, the rear members 42 of the side frames; and another of the cross members extends between, and has its ends welded to, the upper portions of the front members 43 of the side frames. The diagonally extending upper brace members 46 of the side frames extend at right angles to the top members 44 and have the upper ends thereof welded to the upper portions of the top members and their lower ends welded to the rear members 42. The diagonally extending lower brace members 47 are disposed beneath and in parallel relation with the upper brace members 46 and have the upper ends thereof welded to the lower portions of the top members 44 and their lower ends welded to the rear end portions of the horizontally extending bottom members 45. The diagonally extending top members 44 of the side frames preferably extend at a 45° angle with respect to the horizontal.

In addition to the side frames 41, the frame structure 32 comprises a diagonally extending platform 49, a plate 50 and a block 51.

The platform 49 is rectangular and extends over and between the top members 44 of the side frames 41 of the frame structure. It has a flat top surface and is supported on an elongated upper plate 52, an elongated intermediate plate 53 and a pair of strips 54. The upper plate 52 underlies and is bolted or otherwise fixedly secured to the upper portion of the platform 49 and has the ends thereof resting on, and suitably secured to, the upper portions of the top members 44 of the side frames 41. The elongated intermediate plate 53 underlies, and is bolted or otherwise fixedly secured to, the central portion of the platform and has its ends resting on, and suitably secured to, the central portions of the top members of the side frames 41. The strips 54 underlie, and are bolted or otherwise fixedly secured to, the lower corner portions of the platform and rest on, and are suitably secured to, the lower portions of the top members 44. The elongated plates 52 and 53 not only serve as supports for the platform 49 but also assist the cross members 48 in connecting in spaced relation the side frames 41 of the frame structure 32.

The plate 50 is horizontally elongated and rests on the lower portion of the upper surface of the platform 49. It is fixedly secured in place by way of bolts and has formed therein a transversely extending slot 55, a transversely extending slot 56 and a longitudinally extending slot 57. It is upwardly and rearwardly inclined at a 45° angle with respect to the horizontal and, therefore, has upper and lower portions. The transversely extending slot 55 is formed in the upper portion of the plate 50 and defines with the subjacent portion of the platform 49 an inclined chute 58. The latter is slightly wider than the nuts to be tapped and as best shown in Figures 4, 6 and 12 is adapted slidably to receive a single line or row of the nuts. The upper end of the slot 55 intersects or extends through the upper side edge of the plate 50 and the lower end of the slot terminates at the central portion of the plate. The transversely extending slot 56 is formed in the lower portion of the plate 50 and is laterally offset with respect to the transversely extending slot 55 in the upper portion of the plate 50. As viewed in Figures 4, 6 and 12, the slot 56 is disposed slightly to the right of the slot 55. The lower end of the slot 56 intersects or extends through the lower side edge of the plate 50 and the upper end of such slot terminates at the central portion of the plate and is in communication with the lower end of the slot 55. The portion of the plate 50 that defines the upper end of the slot 56 includes two surfaces 59 and 60 which together define the heretofore mentioned tapping station 35.

The surface 59 extends lengthwise of the plate 50 and is adapted when the lowermost or first in line nut is shifted laterally, as hereinafter described in more detail, from the lower end of the chute 58 into the tapping station to abut against one side of the nut. The surface 60 of the plate 50 extends at an angle of 120° with respect to the surface 59 and when a nut is shifted into the tapping station is adapted to abut against another side of the nut as clearly shown in Figure 12. The longitudinally extending slot 57 is formed in the central portion of the plate 50 and is located at the left hand side of the transversely extending slot 55 as viewed in Figures 4, 6 and 12 of the drawings. The right hand end of the slot 58 intersects or communicates with the lower end of the chute-forming slot 55.

The block 51 rests on, and is bolted or otherwise fixedly secured to, the plate 50 and has formed therein an open top upper chamber 61 and an open bottom lower chamber 62. The lower left hand portion of the chamber 61 communicates with the longitudinally extending slot 57 in the plate 50 by way of a vertical passage 63 and the lower right hand portion of the chamber 61 communicates with the upper portion of the lower chamber 62 by way of a vertically extending bore 64. The lower chamber 62 overlies and communicates with the tapping station 35 which as hereinbefore described is formed by the surfaces 59 and 60 at the upper end of the transversely extending slot 56 in the plate 50. The block 51 is surmounted by a plate 65 which is bolted or otherwise fixedly secured in place and forms a support for the cylinder-piston unit 39 of the machine.

*Nut orienting and dispensing unit*

The unit 33 is located over the upper portion of the platform 49 and serves so to orient and dispense the nuts to be tapped that the latter are delivered onto the top surface of the platform 50 with the bases 25 thereof at the bottom. It comprises a rotary drum 66 and a shell 67 around the drum and is the same in construction and mode of operation as that which is disclosed in, and forms the subject matter of, United States Patent No. 2,689,667, granted on September 21, 1954 and entitled "Machine For Orienting and Dispensing Stamped Metal Lock Nut Blanks." The drum 66 of the unit 33 is mounted to rotate about a horizontal axis by way of trunnions which are connected to, and extend outwards from, the end walls of the drum and are journaled in L-shaped bearing brackets 68 on the upper portion of the platform 49. One of the trunnions is solid and the other is tubular in order to form a passageway whereby the nuts to be oriented and dispensed by the unit 33 may be introduced into the drum interior. The side wall 67 of the drum 66 is provided with longitudinally extending, substantially tangential, pin-equipped slots 69 through which the oriented nuts pass during rotation of the drum. The shell 67 has a portion thereof spaced from the drum side wall so as to form an arcuate downwardly extending outlet 70 whereby the oriented nuts after passing through the aforementioned slots in the side wall of the drum are delivered onto the upper portion of the top surface of the platform 49.

The drum 66 of the unit is driven in a counterclockwise direction as viewed in Figure 2 by mechanism comprising an electric motor 71, a gear variety speed reducing unit 72, a pulley and belt connection 73 between the motor 71 and the unit 72, and a sprocket and chain connection 74 between the speed reducing unit 72 and the drum 66 of the nut orienting and dispensing unit 33.

The electric motor 71 is located substantially midway between the upper members 46 and the side frames 41 of the frame structure 32 and comprises a casing 75 and an armature shaft 76. The casing 75 is suitably connected to the central portion of an elongated horizontally extending plate 71a, the ends of which are connected by bolts or other attaching devices to the lower end portions of the upper brace members 46. The armature shaft 76 of the motor 71 is upwardly inclined and as shown in Figure 2 extends at right angles to the platform 49. The ends of the armature shaft project through and beyond the end walls of the casing 75.

The gear variety speed reducing unit 72 is located under the upper portion of the platform 49 and comprises a box-like housing 77, a drive shaft 78 and a driven shaft 79. The housing 77 of the unit 72 is mounted on, and suitably fixedly secured to, an elongated horizontally extending plate 80 the ends of which are connected to the upper end portions of the upper brace members 46 of the side frames 42. The drive shaft 78 is journaled in bearings in the housing 77, is disposed in parallel relation with the armature shaft 76 of the motor 71, and has the lower end thereof exteriorly disposed with respect to the housing 77. The driven shaft 79 of the unit 72 extends horizontally and is driven from the drive shaft 78 by gearing (not shown) within the housing 77. The ends of the shaft 79 are disposed outwards of the housing.

The pulley and belt connection 73 serves to drive the gear variety speed reducing unit 72 from the electric motor 71 and consists of a pulley 81, a pulley 82 and an endless belt 83. The pulley 81 is keyed or otherwise fixedly secured to the upper end of the armature shaft 76 of the electric motor 71, and the pulley 82 is keyed or otherwise fixedly secured to the lower end of the drive shaft 78 of the unit 72. The endless belt 83 extends around the two pulleys.

The sprocket and chain connection 74 serves to drive the drum 66 of the nut orienting and dispensing unit 33 and consists of a sprocket 84, a sprocket 85 and an endless chain 86. The sprocket 84 is mounted on one end of the driven shaft 79 of the unit 72, and the other sprocket, i. e., the sprocket 85, is mounted on, and suitably fixed to, the solid trunnion on the drum 66.

When the motor 71 is in operation, it serves through the medium of the pulley and sprocket connection 73, the gear variety speed reducing unit 72 and the sprocket and chain connection 74 to drive the drum 66 of the unit 33. In connection with drive of the drum, the nuts to be tapped are oriented in connection with passage through the slots 69 in the drum side wall. After passing through the slots, the oriented nuts pass through the outlet 70 onto the upper portion of the top surface of the platform 49.

*Nut feeding means*

The means 34 serves to feed the oriented nuts to be tapped from the unit 33 to the tapping station 35 and comprises a pair of guide bars 87 and 88, a sprocket and chain type agitator 89 and a plate 90.

The guide bar 87 is comparatively long and rests on the top surface of the platform 49. It is disposed in substantially parallel relation with the side edges of the platform and is secured in place by screws 91. The upper end of the guide bar 87 terminates adjacent the outlet 70 of the nut orienting and dispensing unit 33 and the lower end of the guide bar abuts against the upper edge of the plate 50. The other guide bar, i. e., the guide bar 88, is materially shorter than the guide bar 87 and is disposed in spaced apart and parallel relation with the lower portion of the guide bar 87. The upper end of the guide bar 88 terminates adjacent the central portion of the guide bar 87 and the lower end of the guide bar 88 abuts against the upper edge of the plate 50. The guide bar 88 is spaced from the guide bar 87 a distance slightly greater than the width of the nuts to be tapped and defines with said guide bar 87 and the intervening portion of the platform an inclined chute 92, the lower end of which leads to, and communicates with, the upper end of the chute 58. The nuts to be tapped after being oriented and dispensed by the unit 33 slide by gravity down the top surface of the platform 49 and are guided by the upper portion of the guide bar 87 into the chute 92. After entry into the chute 92, the nuts with the bases thereof at the bottom slide downwards in a single line or file through the chute 92 and then through the chute 58.

The sprocket and chain type agitator 89 of the nut feeding means 34 is disposed opposite to the upper portion of the guide bar 87 and serves with the upper portion of such guide bar to collect the nuts as they slide down the upper portion of the platform 49 and also to direct them into the upper end of the chute 92. It also serves to agitate the collected nuts so that they do not jam and pass only one at a time into the chute 92. As best shown in Figures 1 and 4, the agitator 89 comprises a driven sprocket 93, an idler sprocket 94 and an endless chain 95. The driven sprocket 93 overlies, and is in parallel relation with, the central portion of the platform 49 and is disposed an appreciable distance from the upper portion of the guide bar 87. It is mounted on the upper end of an inclined shaft 96 which extends through and is journaled in a hole 97 in the platform 49. The idler sprocket 94 overlies, and is in parallel relation with the platform 49 and is disposed below the driven sprocket 93. It is spaced a small distance from the central portion of the guide bar 87 and is mounted on an inclined spindle 98, the lower end of which is screw threaded and fits within a screw threaded hole 99 in the platform 49 (see Figure 3). The endless chain 95 of the agitator 89 extends around the sprockets 93 and 94 and, in connection with drive of the driven sprocket 93, travels in a counterclockwise direction as viewed in Figures 1 and 4. The upper right hand reach of the chain 95 forms with the adjacent portion of the guide bar 87 an infundibular or funnel shaped space which collects the oriented and dispensed nuts as they slide downwards on the upper portion of the top surface of the platform 49 and directs the nuts one at a time into the upper end of the chute 92. In connection with upward travel of the upper right hand reach of the chain, the nuts in the aforementioned space are agitated so that they do not jam and hence pass freely one at a time into the upper end of the chute 92. The sprocket 93 is driven by mechanism comprising a shaft 100, a sprocket and chain connection 101, a shaft 102, three bevel gears 103, 104 and 105, and a pair of bevel gears 106 and 107. The shaft 100 extends horizontally and is located beneath the central portion of the platform 49. The ends of the shaft 101 are journaled in a pair of bearing brackets 108 which are connected to and depend from the superjacent portion of the platform. The sprocket and chain connection 101 comprises a sprocket 109 on the end of the driven shaft 79 that is opposite the end having the sprocket 84. It also comprises a sprocket 110 on the central portion of the shaft 100 and an endless chain 111 around the sprockets 109 and 110. The shaft 102 is disposed under the central portion of the platform 49 and is journaled in bearing brackets 112 which are connected to and depend from the platform. One end of the shaft 102 is disposed adjacent the shaft 100 and the other end of the shaft 102 is disposed adjacent the driven sprocket 93. The bevel gear 103 is mounted on one end of the shaft 100 and meshes with, and serves to drive, the bevel gear 104. The latter meshes with, and serves to drive, the bevel gear 105 and is mounted on a spindle 113 which is connected to, and depends from, the platform 49. The bevel gear 105 is mounted on the end of the shaft 102 that is adjacent the shaft 100. The bevel gear 106 is mounted on the other end of the shaft 102 and meshes with, and serves to drive, the bevel gear 107. The latter as best shown in Figure 3 is mounted on the lower end of the shaft 96.

The plate 90 of the nut feeding means 34 is horizontally elongated and as shown in Figures 6 and 12 has its left hand end portion shaped conformably to, and mounted for longitudinal sliding movement in, the slot 57 in the central portion of the plate 50. The right hand end portion of the plate 90, as viewed in Figures 6 and 12, is adapted in connection with sliding movement of the plate 90 to the right to extend across the lower end of the chute 98 and into the tapping station 35 (see Figure 12) and has in its upper outer corner a three-sided notch 114. The latter is shaped conformably to, and adapted to receive, three sides of the lowermost or first in line nut in the chute 58. When the plate 90 is slid to the left as viewed in Figures 6 and 12, the notch 114 moves into a position wherein it is at the lower end of the slot 55 and receives by gravity the first in line nut in the chute 58. When the plate 90 is slid to the right, the received first in line nut is shifted laterally from the lower end of the chute 58 into the tapping station 35 and is held loosely against rotation by way of the three sides of the notch 114 and the surfaces 59 and 60 of the plate 90 as shown in Figure 12. In connection with back and forth sliding movement of the plate 90, the nuts to be tapped are fed one at a time from the lower end of the chute 58 to the tapping station 35. As will be pointed out in more detail hereafter, each nut after being tapped by the tap of the tapping head 37 falls by gravity through the lower chamber 62 and the transversely extending slot 56 in the plate 50. Right hand sliding movement of the plate 90 is limited by way of a stop strip 115 which underlies, and is connected by screws 116 to the portion of the plate 50 that defines the left hand side of the transversely extending slot 56. Said stop strip 115 extends transversely of the plate 50 and has the upper end thereof disposed in a groove 117 in the bottom portion of the lower outer corner of the right hand end of the plate 90. The inner end of the notch 117 is defined by a shoulder 118 which abuts against the upper end of the stop strip 115 when the plate 90 is slid to the right to its fullest extent. Back and forth sliding movement of the plate 90 for nut feeding purposes is effected by a cam arrangement consisting of a longitudinally extending cam slot 119 in the left hand end portion of the plate 90 and an upstanding cam type bar 120. At the right hand end of the cam slot 119, as viewed in Figures 5, 6, 11, 12 and 13, is an upwardly facing bevel 121 and at the left hand end of the cam slot is a downwardly facing bevel 122. The central portion of the cam type bar 120 extends through the passage 63 in the block 51 and the upper end of the bar is disposed in the upper chamber 61. The lower end of the cam type bar 120 extends through the cam slot 119 in the plate 90 and has a diagonal part 123 which provides a diagonal downwardly facing cam surface 124, and a diagonal upwardly facing cam surface 125. When the cam type bar 120 is shifted downwards, the cam surface 124 strikes against the upwardly facing bevel 121 and coacts therewith to cause the plate 90 to slide to the right and thus feed the lowermost or first in line nut from the lower end of the chute 58 to the tapping station 35. When the cam type bar 120 is shifted upwards, the diagonal upwardly facing diagonal strikes against the downwardly facing bevel 122 and coacts therewith to slide the plate 90 to the left to the end that the notch 114 is positioned to receive the next in line nut in the lower end of the chute 58. The lower extremity of the cam type bar 120 extends through and moves in a hole 126 in the platform 49.

*Spring biased tubular member for supporting the nuts during tapping*

The tubular member 36 is located at the tapping station 35 and is mounted for up and down sliding movement in a bushing 127. The latter underlies the inner or upper end of the transversely extending slot 56 in the plate 50 and fits snugly within an open ended bore 128 in the platform 49. The upper end of the bushing is provided with an annular outwardly extending flange 129 which fits within a counter bore 130 at the upper end of the bore 128 and serves to prevent downward displacement of the bushing with respect to the platform 49. The lower end of the tubular member 36 is provided with an outwardly extending flange 131 which coacts with the lower end of the bushing 127 to limit upward sliding movement of the tubular member with respect to the bushing. When the tubular member 36 is in its fully up position as shown in Figures 5 and 11, the upper end of the member is flush with the top surface of the platform 49 and is adapted to receive and support the nut that is slid by the plate 90 from the lower end of the chute 58 to the tapping station 35. In connection with a nut tapping operation, the nut at the tapping station and the tubular member 36 move downwards. During downward movement of the nut, the nut as hereinafter described, is tapped by the tap of the tapping head 37. After a nut tapping operation, the tapped nut and the tubular member 36 move upwards with the result that the tapped nut is released from the tap. The tubular member 36 is provided with a spring arrangement whereby it is urged upwards. Such arrangement consists of a disc 132, an annular series of upstanding rods 133 and spiral compression springs 134. The disc 132 is located beneath the tubular member 36 and is in parallel relation with the platform 49. It embodies a hole 135 in its central portion and has in its outer marginal portion an annular series of holes 136 which correspond in number to the rods 133. The outwardly extending flange 131 on the lower end of the tubular member 36 rests on the portion of the disc 132 that defines the hole 135. The rods 133 are disposed beneath, and extend at right angles to, the platform 49. The central portions of the rods extend loosely through the holes 136 in the outer marginal portion of the disc 132 and the upper ends of the rods are screw threaded and fit within screw threaded holes 137 in the platform 49. The lower ends of the rods 133 are provided with heads 138. The springs 134 surround the lower end portions of the rods and serve upwardly to urge the disc 132 and the tubular member 36. The lower ends of the springs 134 rest on the heads 138 and the upper ends of the springs abut against the portions of the disc 132 that define the holes 136.

*Tapping head*

The tapping head 37 of the machine is located or positioned directly beneath the tapping station 35 and is adjustably supported by way of a bracket structure 139. It is driven by the electric motor 71 through the medium of a pulley and belt connection 140 and as its principal parts or components comprises a housing 141, a drive shaft 142, a pair of oppositely driven members 143 and 144, a spindle 145 and a tap 146.

As best shown in Figure 2 of the drawings, the bracket structure 139 is located under the platform 49 and consists of a horizontally elongated plate 147, an upper bracket 148, a lower bracket 149, and a tube 150 between the two brackets. The plate 147 extends between the side frames 41 of the frame structure 32 and has its ends resting on, and suitably secured to, the central portions of the diagonally extending lower brace members 47. The plane of the plate 147 is normal to the platform 49. The upper bracket 148 is bolted to the upper portion of the plate 147. It extends downwards at a 45° angle with respect to the horizontal and embodies in its central portion a circular hole 151. The lower bracket 149 is bolted or otherwise fixedly secured to the lower portion of the plate 147 and is disposed beneath and in parallel relation with the upper bracket 148. The central portion of the lower bracket is provided with a circular hole 152 which is the same in size as, and is in coaxial relation with, the hole 151 in the central portion of the upper bracket 148. The tube 151 of the bracket structure 139 is disposed directly beneath the horizontally elongated plate 147 and extends at right angles to the platform 49. The upper end of the tube 150 fits within, and is connected by a drive or press fit to, the hole defining central portion of the upper bracket 148, and the central portion of the tube extends through, and is connected by a similar fit to, the central hole defining portion of the lower bracket 149. The lower end of the tube 150 projects an appreciable distance beneath the lower bracket and has mounted therein a ball bearing 153.

The housing 141 of the tapping head 37 is normally positioned a small distance beneath the tapping station 35 and consists of a cast metal lower section 154 and a cast metal inverted cup-shaped upper section 155. The lower section 154 rests on, and is bolted or otherwise fixedly secured to, a mounting member 156 and has in the central portion thereof a circular hole 157 in which a ball bearing 158 is mounted. The upper section 155 of the housing 141 consists of a top wall 159 and a depending cylindrical side wall 160. The lower end of the side wall rests on, and is connected by screws 161 to, the outer marginal portion of the lower housing section 154. The mounting member 156 embodies at the bottom portion thereof an integral lug 162 and is connected to the upper end of an upwardly and forwardly inclined sleeve 163. The lower end portion of the sleeve fits slidably in the upper end portion of the tube 150 of the bracket structure 139 in order that the tapping head as a whole may be slid bodily back and forth between an operative up position wherein the tap 146 is adjacent the tapping station 35 and an inoperative down position wherein the tap is disposed an appreciable distance beneath the tapping station and hence may be removed for replacement. A split, screw-equipped clamping collar 164 extends around the central portion of the sleeve 163, rests on the central portion of the upper bracket 148, and serves releasably to hold the tapping head in its operative and inoperative position. A diagonally extending bolt 165 holds the housing 141 against rotation or turning movement while at the same time it permits the housing to be slid up and down. The upper end of the bolt 165 extends loosely through a hole in the lug 162 and is provided with a head 166 in overlying relation with the lug. The lower end of the bolt 165 extends loosely through a hole 167 in the bottom portion of the upper bracket 148 and is provided with nuts 168. The bolt has a two-fold purpose in that it not only holds the housing 141 of the tapping head against rotation or turning movement but also limits upward sliding movement of the tapping head. The head is slid upwards into its operative up position and downwards into its inoperative down position by way of gearing which consists of a pinion 169 and a rack 170. The pinion 169 is located at one side of the tube 150 of the bracket structure 139 and is fixedly connected to the lower end of an upwardly and rearwardly inclined shaft 171. The central portion of the shaft 171 extends through a hole 172 in the horizontally elongated plate 147 and the upper end of the shaft is provided with a handle-forming cross pin 173 in order that the shaft may be turned manually. The rack 170 is connected to, and extends lengthwise of, the sleeve 163 and is in mesh with the pinion 169. The portion of the pinion 169 that is in mesh with the rack extends through a suitable opening (not shown) in the tube 150 of the bracket structure 139. When the clamping collar 164 is released, the tapping head may be slid upwards or downwards by proper turning of the shaft 171 on which the pinion 169 is mounted. After the tapping head has been slid to the desired position, it is contemplated that the clamping collar 164 will be tightened so as to lock the head in place.

The drive shaft 142 of the tapping head 37 is inclined upwards and forwards and extends at a 45° angle with respect to the horizontal. The upper end of the shaft extends through the circular hole 157 in the central portion of the lower housing section 154 and terminates in the lower portion of the interior of the housing 141. The central portion of the drive shaft 142 extends loosely through the sleeve 163, and the lower end of the shaft extends slidably through the inner race of the ball bearing 153 in the lower end of the tube 150.

The pulley and belt connection 140 for driving the tapping head consists of a pulley 174, a pulley 175 and an endless belt 176. The pulley 174 (see Figure 2) is keyed or otherwise fixedly secured to the lower end of the armature shaft 76 of the electric motor 71. The pulley 175 of the connection 140 extends around, and is suitably fixedly secured to, the lower end of the inner race of the ball bearing 153 and has fixed to the lower side thereof a centrally apertured disc 177 for driving the drive shaft 142 of the tapping head 37. The lower end of the drive shaft 142 extends slidably through the aperture in the disc 177 and is connected for drive by the disc by way of a connection comprising a longitudinally extending key 178 on the lower end of the drive shaft and a radially extending notch 179 in the central portion of the disc 177. Such connection effects drive of the shaft 142 from the pulley 175 while at the same time it permits the drive shaft, in connection with adjustment of the tapping head 37, to slide up and down relatively to the pulley 175. The endless belt 176 of the pulley and belt connection 140 extends around the pulleys 174 and 175 and serves when the electric motor is in operation to effect drive of the pulley 175 and the drive shaft 142 from the pulley 174.

The driven member 143 of the tapping head 37 is disposed in the housing 141 and is cup shaped. It is preferably in the form of a metallic casting and consists of a bottom wall 180 and a continuous frusto-conical side wall 181. The bottom wall overlies the lower section 154 of the housing 41 and is provided with an integral depending sleeve-like member 182 which fits within the inner race of the ball bearing 157 and extends around, and is connected by a screw connection 183 to, a reduced tubular stem 184 on the upper end of the drive shaft 142 of the tapping head. By reason of the fact that the sleeve-like member 182 on the bottom wall 180 is connected to the tubular stem 184 on the upper end of the drive shaft 142 by the screw thread connection 183, the driven member 143 is driven conjointly with the drive shaft 142 in connection with drive of the latter by the electric motor 71. The inner periphery of the lower portion of the continuous side wall 181 of the driven member 143 defines a downwardly tapered clutch surface 185. The upper end of the side wall 181 terminates a small distance beneath the top wall 159 of the upper section 155 of the housing 41.

The driven member 144 of the tapping head 37 is located in the upper portion of the driven member 143 and consists of a top wall 186 and a continuous depending frusto-conical side wall 187. The inner periphery of the side wall 187 constitutes an upwardly tapered clutch surface 188 which as shown in Figure 19 of the drawings is disposed directly above, and forms the complement of, the downwardly tapered clutch surface 185. The top wall 186 of the driven member 144 is provided with an integral upwardly extending hub 189, the upper end of which is journaled in a ball bearing 190, the outer race of which fits within an annular groove 191 in the top wall 159 of the upper section 155 of the housing 141. The driven member 144 is driven conjointly with but reversely to the driven member 143 by way of gearing which consists of a ring gear 192, a pinion 193 and a gear 194. The ring gear 192 is disposed within the upper end of the continuous side wall 181 of the driven member 143 and is secured thereto by way of a screw thread connection 195. The pinion 193 meshes with the internally disposed teeth of the ring gear 192 and is rotatably mounted on the lower end of an upstanding shaft 196 which is connected to, and depends from, the top wall 159 of the upper housing section 155. The gear 194 meshes with the pinion 193 and is formed integrally with the central portion of the hub 189. When the shaft 142 of the tapping head 37 is driven by the electric motor 71, the driven member 143 is driven in one direction and the driven member 144, due to the ring gear 192, the pinion 193 and the gear 194, is driven in the reverse or opposite direction.

The spindle 145 of the tapping head 37 is disposed above, and coaxially positioned with respect to, the drive shaft 142 and embodies on the upper end thereof a chuck 197 for the tap 146. The central portion of the spindle extends loosely through the hub 189 on the top wall 186 of the driven member 144 and is journaled in a bearing 198. The latter overlies the hub 189 and is mounted in a hole 199 in the central portion of the top wall 159 of the upper housing section 155. The lower end of the spindle 145 is provided with a reduced steam 200 which is journaled in a bearing 201 in the upper end of the tubular stem 184 on the upper end of the drive shaft 142. The bearings 198 and 201 permit the spindle 145 not only to rotate freely relatively to the housing 141 of the tapping head but also to slide axially, i. e. up and down, to a limited extent. The portion of the spindle 145 that is between the bottom wall 180 of the driven member 143 and the top wall 186 of the driven member 44 is provided with a downwardly tapered clutch member 202 and a superposed upwardly tapered clutch member 203. The two clutch members are suitably fixedly connected to the last mentioned portion of the spindle 145. The downwardly tapered clutch member 202 is disposed within the lower portion of the continuous side wall 181 of the driven member 143 and is adapted when the spindle 145 is slid downwards to be brought into clutched or driving relation with the downwardly tapered clutch surface 185 and effect drive of the spindle by the driven member 143 and when the spindle is slid upwards to be brought out of clutched relation with the downwardly tapered clutch surface 185. The upwardly tapered clutch member 203 is disposed within the continuous side wall 187 of the driven member 144 and is adapted when the spindle 145 is slid upwards to be brought into clutched relation with the upwardly tapered clutch surface 188 and effect drive of the spindle from the driven member 144 and when the spindle is slid or shifted downwards to be brought into unclutched relation with the clutch surface 188. A spiral compression spring 204 urges the spindle 145 downwards in order that normally the clutch member 202 is in clutched relation with the downwardly tapered clutch surface 185. Such spring extends around the central portion of the spindle and has its lower end in abutment with the central portion of the upwardly tapered clutch member 203 and its upper end in abutment with a washer 204a on the central portion of the spindle.

The tap 146 of the tapping head 137 is conventional or standard and is positioned in coaxial relation with the spindle 145. The lower end of the tap is held removably in the chuck 197 and the upper end of the tap is disposed directly beneath the tapping station 35 when the tapping head is in its operative position. As best shown in Figures 5, 11, 13 and 14 the upper end of the tap 146 is surrounded by the tubular member 36. When a nut at the tapping station 35 moves downwards with the tubular member 36, the nut slides downwards around, and is tapped by, the upper end of the tap. The tap in connection with a nut tapping operation is driven in the proper direction as a result of the spindle 145 being driven by the driven member 143 through the medium of the clutch member 202. At the end of a nut tapping operation, the nut is released as hereinafter described and moves upwards with the tubular member 36 in response to the aforementioned spring arrangement which includes the spiral compression springs 134. During the initial part of upward movement of the tapped nut, the tap 146 and the spindle 145 are slid upwards against the force of the spiral compression spring 204 with the result that the clutch member 203 is brought into clutched relation with the upwardly tapered clutch surface 188 and serves reversely to drive the tap to the end that the tapped nut feeds freely off of the upper end of the tap. The gearing for driving the driven member 144 from the driven member 143 is so designed or constructed that it results in the member 144 being driven at approximately twice the speed of the driven member 143. As a result of this reverse drive of the tap 146 in connection with a nut removing operation is approximately twice as fast as normal drive of the tap during a nut tapping operation.

*Anvil*

The anvil 38 of the machine is located over the nut tapping station 35 and is elongated. It is disposed in coaxial relation with the tap 146 of the tapping head 37 and as hereinafter described is slid or moved up and down by the cylinder-piston unit 39. The upper end of the anvil is disposed in the upper chamber 61 in the block 51 and the central portion of the anvil extends slidably through a bushing-like nut stripper 205 in the bore 64 between the upper and lower chambers 61 and 62. The bushing-like nut stripper 205 fits snugly in the bore 64 and embodies at its upper end an outwardly extending flange 206 which fits snugly in a counter bore 207 at the upper end of the bore 64. The internal surface of the nut stripper and the external surface of the anvil are hexagonal in cross section. The lower end of the anvil has a longiudinal open bottom bore 208 in order that it is tubular and in addition is adapted to receive the upper end of the tap 146 in connection with downward movement of the anvil as shown in Figure 13. As best shown in Figure 8 of the drawings, the lower end of the anvil is provided with six equidistantly spaced longitudinally extending slots 209 in order to form an annular series of fingers 210. The slots 209 are formed in the lower end of the anvil so that they are midway between the six corners of the anvil and hence the fingers 210 are substantially pentagonal in cross section. The lower ends of the fingers 210 are adapted and shaped snugly to fit within the spaces between the pentagonal spaces between the flanges 28 and the tongues 29 of the nut at the tapping station.

When the anvil 38 is in its up position, the lower end thereof is disposed above the lower end of the bushing-like nut stripper 205 as shown in Figure 5. In connection with initial downward sliding movement of the anvil, the lower end of the anvil first moves downwards through the lower chamber 62 in the block 51 and then enters the upper end of the transversely extending slot 56. In connection with entry of the lower end of the anvil into the upper end of the slot 56, the lower ends of the fingers 210 slide into the spaces between the flanges 28 and the tongues 29 of the nut at the tapping station 35 and are brought into abutment with the hexagonal base 25 of the nut (see Figure 11). In connection with completion of downward sliding movement of the anvil, the lower end of the anvil causes the nut and the tubular member 36 to slide downwards around the upper end of the tap 146 (see Figure 13). During downward sliding movement of the nut the cylindrical sleeve 27 and the inner ends of the tongues 29 of the nut are tapped by the tap. At the end of the nut tapping operation, the anvil slides upwards. In connection with initial upward sliding movement of the anvil, the tapped nut and the tubular member 36 slide conjointly upwards until the tubular member is arrested by its flange 131 striking against the lower end of the bushing 127. In connection with further upward sliding movement of the nut, the tapped nut moves upwards with the lower end of the anvil until it is arrested as the result of striking against the lower end of the nut stripper 205. Further upward movement on the part of the anvil results in withdrawal of the lower ends of the fingers 210 from the spaces between the flanges and the tongues of the nut. After withdrawal of the lower ends of the fingers from such spaces, the tapped nut drops by gravity through the lower compartment 62 and the transversely extending slot 56 in the plate 50. By reason of the fact that the lower ends of the fingers fit snugly within the spaces between the flanges and tongues of the nut at the tapping station, the tongues of the nut are rigidly held against lateral flexing during downward and upward movement of the anvil with respect to the tap and hence the tap in connection with a nut tapping operation is not subjected to appreciable wear. If the tongues of the nut at the tapping station were not held against lateral flexing, the inner ends thereof, in connection with removal of the nut from the tap, would dig into the tap and cause such appreciable wear as to require frequent replacement of the tap.

As described hereafter, the cam type bar 120 for sliding the plate 90 back and forth is connected so that it moves up and down with the anvil 38. The diagonal part 123 of the bar 120 is so arranged that the plate 90 is slid to the right for nut feeding purposes during the middle part of downward sliding movement of the anvil and is slid to the left during the middle part of upward sliding movement of the anvil. The plate 90 because of the design or construction of the cam arrangement therefor (cam slot 119 and cam type bar 120) slides back and forth in properly timed relation with downward and upward sliding movement of the anvil.

*Cylinder-piston unit for effecting sliding movement of the anvil*

The double acting cylinder-piston unit 39 is located above the anvil 38 and serves in connection with actuation thereof to slide the anvil downwards and upwards. It is pneumatically actuated and consists of a cylinder 211 and a piston 212.

The cylinder of the unit 39 is coaxially positioned with respect to the anvil 38 and the tap 146 of the tapping hear 37 and comprises a cylindrical side wall 213, an upper head 214 and a lower head 215. The cylindrical side wall 213 extends at a 45° angle with respect to the horizontal and has a port 216 at its upper end and a port 217 at its lower end. The upper head 214 of the cylinder 211 extends across the upper end of the side wall 213 and is provided with a depending annular flange 218 which surrounds the upper end of the side wall and is removably attached thereto by a screw thread connection 219. The lower head 215 extends across, and is suitably secured to, the lower end of the cylinder side wall 213. It rests on the plate 65 on the block 51 and embodies on its central portion an integral, depending, externally threaded, tubular nipple 220. The latter as best shown in Figures 5 and 11 of the drawings extends through a screw threaded hole 221 in the plate 65 and terminates in the upper portion of the upper chamber 61 in the block 51.

The piston 212 of the cylinder-piston unit 39 is mounted for longitudinal sliding movement in the cylindrical side wall 213 of the cylinder 211 and is provided with a depending piston rod 222 which extends slidably through the nipple 220 on the central portion of the lower head 215. The upper end of the piston rod 222 is suitably connected to the central portion of the piston 212 and the lower end of the piston rod is disposed in the upper chamber 61 in the block 51 and is provided with a coupling 223 whereby it is removably connected to the upper end of the anvil 38. When air under pressure is introduced into the upper end of the cylinder 211 via the port 216 and the port 217 is vented to atmosphere, the piston 212, together with the piston rod 222 and the anvil 38, slides downwards; and when air under pressure is introduced into the lower end of the cylinder via the port 217 and the port 216 in the upper end of the cylindrical side wall 213 is vented to atmosphere, the piston together with the piston rod and the anvil, slides upwards.

The lower end of the piston rod 222 is connected to the upper end of the upstanding cam type bar 120 by way of a horizontally extending bracket-like plate 224 (see Figures 5, 11 and 15). The right hand end of the plate 224 as viewed in the last mentioned figures is provided with a hole 225 through which the lower end of the piston rod 222 extends. Such end of the piston rod is provided with a pair of nuts 226 which are arranged in straddled relation with the right hand end of the plate 224 and serve fixedly to connect such end of the plate to the lower end of the piston rod. The left hand end of the bracket-like plate 224, as viewed in Figures 5, 11 and 15, is provided with a hole 227. The upper end of the cam type bar 120 embodies an integral, reduced, screw threaded stem 228 which extends upwards through the hole 228 and is provided with a nut 229 for clamping the left hand end of the plate 224 against the upper end of the cam type bar 120. In view of the manner in which the cam type bar is connected to the lower end of the piston rod 222, the bar is caused to slide downwards and upwards conjointly with the anvil 38.

*Electric valve*

The electric valve 40 is associated with, and serves to control the operation of, the double acting cylinder-piston unit 39. It is controlled by a pair of micro-switches 230 and 231 on the upper side surface of the block 51 and, as shown in Figure 20 of the drawings, comprises a casing 232 and a rotatable plug 233.

The casing 232 of the electric valve 40 is mounted on, and suitably secured to, the cylindrical side wall 213 of the cylinder of the cylinder-piston unit 39. It embodies a cylindrical seat 234 in its central portion and has four passages 235, 236, 237 and 238. The passage 235 leads to the outer side portion of the seat 234 and is adapted to receive air under pressure by way of a pipe 239, the inlet end of which is connected to any suitable source of air under pressure, such for example as a compressor, and the discharge end of which is connected to the outer end of the passage 235. The pasage 236 in the valve casing 232 leads from the inner side portion of the seat 234 to atmosphere and constitutes a vent. The passage 237 is formed in the upper portion of the valve casing 232 and extends between, and communicates with, the upper portion of the seat 234 and the port 216 in the upper end of the side wall of the cylinder 211. The passages 238 is located in the lower portion of the valve casing 232 and extends between, and communicates with, the bottom portion of the seat 234 and the port 217 in the lower end of the cylinder side wall 213.

The plug 233 is rotatably mounted in the cylindrical seat 234 in the casing 232. It is adapted to rotate back and forth throughout an arc of 90° and embodies a pair of diametrically opposite arcuate ports 240 and 241. As shown in Figure 20, each of such ports extends throughout a 90° arc. When the plug 233 is positioned as shown in Figure 20, the port 240 establishes communication between the passages 235 and 237 and the port 241 establishes communication between the passages 238 and 236 with the result that air under pressure enters the upper end of the cylinder 211 and the lower end of the cylinder is vented to atmosphere, and hence the piston 212, together with the piston rod 222 and the anvil 38, is caused to slide downwards. When the plug 233 is rotated 90° in a counterclockwise direction as viewed in Figure 20, the port 240 establishes communication between the passages 235 and 238 and the port 241 establishes communication between the passages 237 and 236 with the result that air under pressure is introduced into the lower end of the cylinder 211 and the upper end of the cylinder is vented to atmosphere and hence the piston 212, together with the piston rod and the anvil, is caused to slide upwards.

The plug 233 of the electric valve 40 is turned or rotated back and forth by means of a rack 242 and a pinion 243. The rack is disposed adjacent to the casing 232, extends horizontally, and is suitably mounted for longitudinal sliding movement. The pinion 243 is mounted on, and fixed to, one end of the plug 233 and is arranged so that its teeth are in mesh with the teeth of the rack 242. When the rack is slid to the right as viewed in Figure 20, it operates through the medium of the pinion 243 to rotate the plug 233 into the position shown in Figure 20. When the rack is slid to the left, it operates to turn the plug in a counterclockwise direction and throughout an arc of 90°.

The rack 242 is slid to the right by way of a solenoid 244 under control of the micro-switch 230 and the rack is shifted to the left by way of a solenoid 245 under control of the micro-switch 231. The solenoid 244 extends around the right hand end of the rack as viewed in Figure 20 and the other solenoid, i. e., the solenoid 245, extends around the left hand end of the rack.

The micro-switch 230 is mounted on the upper portion of the upper side face of the block 51 as shown in Figures 2 and 3. It is positioned adjacent to the upper compartment 61 and consists of a fixed contact 246 and a pivoted, normally open, spring biased contact 247. The fixed contact 246 is connected by a conductor 248 to a source 249 of electric current. The pivoted contact 247 is connected by a conductor 250 to one end of the solenoid 244. As shown in the diagram constituting Figure 21, the other end of the solenoid 244 is connected to ground. When the micro-switch 230 is closed as the result of the pivoted contact 247 being swung into engagement with the fixed contact 246, the following circuit is completed: electric source 249, conductor 248, contact 246, contact 247, conductor 250 and solenoid 244. Establishment of such circuit results in the solenoid 244 being energized and causing the rack 242 to slide to the right. As previously pointed out, such sliding movement on the part of the rack results in such control of the valve 40 as to cause downward sliding movement of the piston 212 together with the piston rod 222 and the anvil 38. A rod 251 (see Figures 2 and 3) serves automatically to close the micro-switch 230 when the piston 212 of the cylinder-piston 39 reaches the end of its up stroke. Such rod is connected to the lowermost nut 226 on the lower end of the piston rod 222 and extends upwards and rearwards through the upper chamber 61 in the block 51. The micro-switch 230 is so positioned that when the piston 212 reaches the end of its up stroke in the cylinder 211, the upper end of the rod 251 strikes against the pivoted contact 247 and swings the latter into engagement or contact with the fixed contact 246, thus establishing or completing the aforementioned circuit.

The micro-switch 231 is mounted on the lower portion of the upper side face of the block 51. It is positioned adjacent to the upper compartment 61 and consists of a fixed contact 252 and a pivoted, normally open, spring biased contact 253. The fixed contact 252 is connected by a conductor 254 to the electric source 249. The pivoted contact 253 is connected by a conductor 255 to one end of the solenoid 245. The other end of such solenoid is grounded. When the micro-switch 231 is closed as a result of the pivoted contact 253 being swung into engagement with the fixed contact 252, the following circuit is completed: electric source 249, conductor 254, fixed contact 252, pivoted contact 253, conductor 255 and solenoid 245. Establishment of such circuit results in the solenoid 245 being energized and causing the rack 242 to slide to the left. As previously pointed out, such sliding movement on the part of the rack results in such control of the valve 40 as to cause upward sliding movement of the piston 212 together with the piston rod 222 and the anvil 38. The micro-switch 231 is so positioned that when the piston 212 of the cylinder-piston unit 39 reaches the end of its down stroke, the movable contact 253 is engaged by the upper end of the rod 251 and swung by the rod into engagement or contact with the fixed contact 252.

From the foregoing it is apparent that the electric valve 40 so controls the double acting, cylinder-piston unit 39 that the piston of the unit is caused to slide downwards and upwards automatically.

Auxiliary equipment

In addition to the parts heretofore mentioned, the nut tapping machine comprises means for delivering a combined coolant and lubricant in the form of oil or any other suitable liquid to the nut being tapped. Such means comprises a header 256 and a delivery pipe 257 (see Figures 1 and 2). The header 256 extends horizontally over the central lower portion of the platform 49 and overlies the sprocket and chain type agitator 89. It is supported by upstanding brackets 258 on the platform and has one end thereof closed. The other end of the header is connected by a pipe 259 to any suitable source of oil under pressure. The delivery pipe 257 leads downwards from the header 256 to the lower portion of the block 51. The upper end of the feed pipe is connected to the header by way of a cock 260. The latter serves to control the flow of oil through the feed pipe. The lower end of the feed pipe is connected by a nipple 261 to one end of a duct 262 in the lower portion of the block 51. The other end of such duct leads to the lower chamber 62 in the block and as a result the oil that flows through the feed pipe cascades downwards onto the nut at the feed station 35.

Operation

When it is desired to operate the machine current is supplied to the electric motor 71. The motor as soon as it is started operates to drive the drum 66 of the nut orienting and dispensing unit 33, the agitator 89 of the nut feeding means 34 and the drive shaft 142 of the tapping head 37. In connection with the drive of the drum 66 of the unit 33 the oriented nuts after passing through the aforementioned pin-equipped slots 69 in the drum side wall are discharged via the shell outlet 70 and with the bases thereof at the bottom. After passing through the outlet, the nuts slide by gravity down the upper portion of the top surface of the platform 49 until they strike against either the upper end portion of the guide bar 87 or the upper right hand reach of the chain 95 of the sprocket and chain type agitator. After the oriented nuts slide by gravity into the funnel shaped space between the upper end portion of the guide bar 87 and the aforementioned reach of the chain of the agitator, they are agitated by the agitator and delivered one at a time into the upper end of the chute 92. From the chute 92, the nuts slide into the chute 58. After retraction or left hand sliding movement of the plate 90, the lowermost or first in line nut in the chute 58 slides into the three-sided notch 114 in the upper outer corner of the plate 90. In connection with initial downward sliding movement of the anvil, the slidably mounted nut feeding plate 90 slides to the right and moves the first in line nut into the tapping station 35 where it rests on the upper end of the spring biased tubular member 36. As the anvil 38 continues to move downwards, the lower ends of the fingers 210 enter, and slide into tight gripping relation with, the spaces between the flanges 28 and the tongues 29 of the untapped nut at the station. Further downward sliding movement on the part of the anvil results in the untapped nut and the tubular member 36 sliding downwards. In connection with downward sliding movement of the nut, the tap 146 of the tapping head 37 taps the nut so that the cylindrical sleeve 27 thereof has the internal screw thread 30 and the inner ends of the tongues 29 have the spirally arranged teeth 31 which as heretofore mentioned are in phase or conformity with the screw thread 30. After completion of the tapping operation, the anvil, in response to operation of the cylinder-piston unit 37, slides upwards. During the initial part of upward sliding movement of the anvil, the tapped nut is urged upwards by the tubular member 36. In connection with upward urging of the nut, the tap is slid upwards to a limited extend and results in the upwardly tapered clutch member 203 being brought into clutched relation with the upwardly tapered clutch surface 188. This action on the part of the tap results in the tap being reversely driven and thereby freeing the tapped nut so that it in turn is free to move upwards with the spring biased tubular member 36 until the latter is arrested as the result of its outwardly extending flange 131 striking the lower end of the bushing 127. In connection with further upward movement of the anvil, the tapped nut moves upwards with the anvil until it is stripped from the anvil as the result of contact or abutment with the lower end of the stripper 205. The tapped nut after being stripped from the anvil by the stripper drops downwards through the lower chamber 62 in the block 51 and the transversely extending slot 56 in the bottom portion of the plate 50. It is contemplated that any suitable container will be placed under the slot 56 so as to catch the tapped nuts as they are discharged one at a time. In connection with the middle part of upward sliding movement of the anvil, the cam type bar 120 cams the slidably mounted plate into its retracted position (see Figure 6) so that it is again in readiness to receive the next in line untapped nut in the chute 58.

*General*

The herein described nut tapping machine due to its particular arrangement of parts and mode of operation operates wholly automatically and at a comparatively rapid rate. It effectively and efficiently fulfills its intended purpose and is capable of being produced and operated at a comparatively low cost.

Whereas the machine has been described and illustrated in connection with tapping of stamped metal self-locking nuts of the type that forms the subject matter of United States Patent No. 2,294,059, it is to be understood that it may be utilized to tap other types of nuts or similar articles. It is also to be understood that the invention is not to be restricted to the particular details set forth since these may be modified within the scope of the appended claims without departing from the spirit and scope of the invention.

Having thus described the invention what I claim as new and desired to secure by Letters Patent is:

1. A machine adapted to tap nuts and comprising: a frame structure provided with fixed means forming a stationary tapping station; means for positively feeding the nuts to be tapped one at a time to the tapping station; a power driven tapping head mounted on the frame structure beneath the tapping station and embodying an upwardly extending rotatable tap directly under said tapping station and automatic tap driving mechanism whereby the tap is driven in one direction for nut tapping purposes when a nut at the station is moved downwards onto the tap and the tap is reversely driven so as to back off the tapped nut when the nut after a tapping operation is moved upwards; a tubular nut supporting member located at the tapping station, extending loosely around the tap, mounted for limited down and up sliding movement, provided with spring means for urging it into its up position, and adapted when in its up position to receive and support the nuts on its upper end as they are fed one at a time to the stationary tapping station by the nut feeding means; an elongated tubular anvil separate from and independent of the tubular member, positioned above the tapping station and in coaxial relation with the tap, mounted for down and up sliding movement towards and away from the tap, and adapted during the middle part of its downward sliding movement to have its lower end engage the nut at the tapping station and during the remainder of its said downward sliding movement to slide the nut and tubular member downwards against the force of said spring means and around the tap for nut tapping purposes; and power actuated means for sliding the anvil downwards and upwards.

2. A machine adapted to tap nuts and comprising: a frame structure provided with fixed means forming a stationary tapping station; means operative to feed the nuts to be tapped one at a time to the tapping station and embodying an inclined chute adapted to have the nuts slide downwards therein in single file and having its lower end terminating at one side of the tapping station, and a nut feeding plate mounted on the frame structure for horizontal back and forth sliding movement adjacent to the lower end of the chute and adapted when slid in one direction positively to shift the lowermost nut in the chute from the chute to the tapping station and when slid in the opposite direction to receive the next lowermost nut in the chute; a power driven tapping head mounted on the frame structure beneath the tapping station and embodying an upwardly extending rotatable tap directly under said tapping station and automatic tap driving mechanism whereby the tap is driven in one direction for nut tapping purposes when a nut at the station is moved downwards onto the tap and the tap is reversely driven so as to back off the tapped nut when the nut after a tapping operation is moved upwards; a tubular nut supporting member located at the tapping station, extending loosely around the tap, mounted for limited down and up sliding movement, provided with spring means for urging it into its up position, and adapted when in its up position to receive and support the nuts on its upper end as they are fed one at a time to the tapping station by the nut feeding means; an elongated tubular anvil separate from and independent of the tubular member, positioned above the tapping station and in coaxial relation with the tap, mounted for down and up sliding movement towards and away from the tap, and adapted during the middle part of its downward sliding movement to have its lower end engage the nut at the tapping station and during the remainder of its said downward sliding movement to slide the nut and tubular member downwards against the force of said spring means and around the tap for nut tapping purposes; power actuated means for sliding the anvil downwards and upwards; and means operative to slide said plate back and forth in timed relation with downward and upward sliding movement of the anvil and including a part connected to the anvil so that it is movable conjointly therewith.

3. A machine adapted to tap nuts and comprising: a frame structure provided with fixed means forming a stationary tapping station; means operative to feed the nuts to be tapped one at a time to the tapping station and embodying an inclined chute adapted to have the nuts slide downwards therein in single file and having its lower end terminating at one side of the tapping station, and a nut feeding plate mounted for horizontal back and forth sliding movement adjacent to the lower end of the chute and adapted when slid in one direction positively to shift the lowermost nut in the chute from the chute to the tapping station and when slid in the opposite direction to receive the next lowermost nut in the chute; a power driven tapping head mounted on the frame structure beneath the tapping station and embodying an upwardly extending rotatable tap directly under said tapping station and automatic tap driving mechanism whereby the tap is driven in one direction for nut tapping purposes when a nut at the station is moved downwards onto the tap and the tap is reversely driven so as to back off the tapped nut when the nut after a tapping operation is moved upwards; a tubular nut supporting member located at the tapping station, extending loosely around the tap, mounted for limited down and up sliding movement, provided with spring means for urging it into its up position, and adapted when in its up position to receive and support the nuts on its upper end as they are fed one at a time to the tapping station by the nut feeding means; an elongated tubular anvil separate from and independent of the tubular member, positioned above the tapping station and in coaxial relation with the tap, mounted for down and up sliding movement towards and away from the tap, and adapted during the middle part of its downward sliding movement to have its lower end engage the nut at the tapping station and during the remainder of its said downward sliding movement to slide the nut and tubular member downwards against the force of said spring means and around the tap for nut tapping purposes; and a cam arrangement operative automatically to slide said plate back and forth in timed relation with downward and upward sliding movement of the anvil and embodying a cam slot in the plate and a cam type bar extending slidably through the slot and connected to the anvil so that it is movable conjointly therewith.

4. A machine adapted to tap nuts and comprising: a frame structure provided with fixed means forming a stationary tapping station; means for positiviely feeding the nuts to be tapped one at a time to the tapping station; a power driven tapping head mounted on the frame structure beneath the tapping station and embodying an upwardly extending rotatable tap directly under said tapping station and automatic tap driving mechanism whereby the tap is driven in one direction for nut tapping purposes when a nut at the station is moved downwards onto the tap and the tap is reversely driven so as to back off the tapped nut when the nut after a tapping operation is moved upwards; a tubular nut supporting member located at the tapping station, extending loosely around the tap, mounted for limited down and up sliding movement, provided with spring means for urging it into its up position, and adapted when in its up position to receive and support the nuts on its upper end as they are fed one at a time to the tapping station by the nut feeding means; an elongated tubular anvil separate from and independent of the tubular member, positioned above the tapping station and in coaxial relation with the tap, mounted for down and up sliding movement towards and away from the tap, and adapted during the middle part of its downward sliding movement to have its lower end engage the nut at the tapping station and during the remainder of its said downward sliding movement to slide the nut and tubular member downwards against the force of said spring means and around the tap for nut tapping purposes; a pneumatically actuated, double acting, cylinder-piston unit operative when actuated to slide the anvil downwards and upwards, supported by the frame structure so that it is positioned above the anvil, and having the piston thereof provided with a depending piston rod the lower end of which is connected to the upper end of the anvil and is provided with a fixed radially extending rod-like element; and an electric valve operative to control the unit and embodying a lower normally open micro-switch positioned to be engaged and closed by the element when the anvil reaches the end of its downward sliding movement and an upper normally open micro-switch positioned to be engaged and closed by said element when the anvil reaches the end of its upward sliding movement.

5. A machine adapted to tap nuts and comprising: a frame structure provided with fixed means forming a stationary tapping station; means operative to feed the nuts to be tapped one at a time to the tapping station and embodying an inclined chute adapted to have the nuts slide downwards therein in single file and having its lower end terminating at one side of the tapping station, and a nut feeding plate mounted for horizontal back and forth sliding movement adjacent to the lower end of the chute and adapted when slid in one direction to shift the lowermost nut in the chute from the chute to the tapping station and when slid in the opposite direction to receive the next lowermost nut in the chute; a power driven tapping head mounted on the frame structure beneath the tapping station and embodying an upwardly extending rotatable tap directly under said tapping station and automatic tap driving mechanism whereby the tap is driven in one direction for nut tapping purposes when a nut at the station is moved downwards onto the tap and the tap is reversely driven so as to back off the tapped nut when the nut after a tapping operation is moved upwards; a tubular nut supporting member located at the tapping station, extending loosely around the tap, mounted for limited down and up sliding movement, provided with spring means for urging it into its up position, and adapted when in its up position to receive and support the nuts on its upper end as they are fed one at a time to the tapping station by the nut feeding means; an elongated tubular anvil separate from and independent of the tubular member, positioned above the tapping station and in coaxial relation with the tap, mounted for down and up sliding movement towards and away from the tap, and adapted during the middle part of its downward sliding movement to have its lower end engage the nut at the tapping station and during the remainder of its said downward sliding movement to slide the nut and tubular member downwards against the force of said spring means and around the tap for nut tapping purposes; a pneumatically actuated, double acting, cylinder-piston unit operative when actuated to slide the anvil downwards and upwards, supported on the frame structure so that it is positioned above the anvil, and having the piston thereof provided with a depending piston rod the lower end of which is connected to the upper end of said anvil and is provided with a fixed radially extending rod-like element; an electric valve operative to control the unit and embodying a lower normally open micro-switch positioned to be engaged and closed by the element when the anvil reaches the end of its downward sliding movement and an upper normally open micro-switch positioned to be engaged and closed by said element when the anvil reaches the end of its upward sliding movement; and a cam arrangement operative automatically to slide said plate back and forth in timed relation with downward and upward sliding movement of the anvil and embodying a cam slot in the plate and a cam type bar extending slidably through the slot and fixedly connected to said piston rod.

6. A machine adapted to tap stamped metal self-locking nuts and comprising: a frame structure embodying a downwardly inclined platform and provided with fixed means at the lower portion of the platform forming a stationary tapping station; a nut orienting and dispensing unit mounted on the upper portion of the platform, embodying a rotatable drum and a stationary shell around the drum, and adapted during drive of the drum to dispense the nuts in oriented fashion onto the upper portion of the platform so that they are free to slide down said platform; a downwardly inclined chute located on the lower portion of the platform, adapted to have the nuts slide downwards therein in single file, and having its lower end terminating at one side of said tapping station; means operative to guide the nuts so that they are directed towards the upper end of the chute as they slide down the central portion of the platform and embodying a sprocket and chain type agitator positioned over and in parallel relation with the central portion of said platform and having its lower end disposed adjacent to the upper end of the chute; means adjacent to the lower end of the chute for positively feeding the nuts one at a time from the chute to the tapping station; a power driven tapping head mounted on the frame structure beneath the tapping station and embodying an upstanding rotatable tap directly under said tapping station and automatic tap driving mechanism embodying a drive shaft and operative to drive the tap in one direction for nut tapping purposes when a nut at the station is moved downwards onto the tap and to drive the tap reversely when the nut after a tapping operation is moved upwards; a tubular nut supporting member located at the tapping station, extending loosely around the tap, mounted for limited down and up sliding movement, provided with spring means for urging it into its up position, and adapted when in its up position to receive and support the nuts on its upper end as they are fed one at a time to the tapping station by the nut feeding means; an elongated tubular anvil separate from and independent of the tubular member positioned above the tapping station and in coaxial relation with the tap, mounted for down and up sliding movement towards and away from the tap, and adapted during the middle part of its downward sliding movement to have its lower end engage the nut at the tapping station and during the remainder of its said downward sliding movement to slide the nut and the tubular member downwards against the force of said spring means and around the tap for nut tapping purposes; power actuated means for sliding the anvil downwards and upwards; and a single electric motor mounted on the frame structure and connected conjointly to drive the drum of the unit, the agitator and said drive shaft.

7. A machine adapted to tap stamped metal self-locking nuts of the type that embodies a polygonal base with a circular hole in the central portion thereof, a series of right angle flanges corresponding in number to, and connected to certain portions of, the side margins of the base, and a series of inwardly extending laterally flexible tongues corresponding in number to the flanges and having the outer ends thereof connected to certain ends of the flanges and their inner ends terminating adjacent to the hole, said machine comprising: a frame structure provided with fixed means forming a stationary tapping station; means for feeding the nuts to be tapped one at a time to the tapping station and so that the bases thereof are at the bottom; a power driven tapping head mounted on the frame structure beneath the tapping station and embodying an upwardly extending rotatable tap directly under the station and automatic tap driving mechanism whereby the tap is driven in one direction for nut tapping purposes when a nut at the station is shifted downwards onto the tap and the tap is reversely driven so as to back off the tapped nut when the nut after a tapping operation is shifted upwards; a tubular nut supporting member located at the tapping station, extending loosely around the tap, mounted for limited down and up sliding movement, provided with spring means for urging it into its up position, and adapted when in its said up position to receive and support the nuts on its upper end as they are fed one at a time to the tapping station by the nut feeding means; an elongated anvil separate from and independent of the tubular member, positioned above the tapping station and in coaxial relation with the tap, mounted for down and up sliding movement towards and away from the tap, provided at its lower end with a continuous series of spaced apart fingers corresponding in number to, and shaped snugly to fit within, the spaces between the flanges and tongues of the nut at the tapping station, adapted during the middle part of its downward sliding movement to have the lower ends of its fingers enter the aforementioned spaces of the nut at the tapping station and during the remainder of its said downward sliding movement to slide the nut and the tubular member downwards against the force of said spring means and around the tap for nut tapping purposes; and power means for sliding the anvil downwards and upwards.

8. A machine adapted to tap stamped metal self-locking nuts of the type that embodies a polygonal base with a circular hole in the central portion thereof, a series of right angle flanges corresponding in number to, and connected to certain portions of, the side margins of the base, and a series of inwardly extending laterally flexible tongues corresponding in number to the flanges and having the outer ends thereof connected to certain ends of the flanges and their inner ends terminating adjacent to the hole, said machine comprising: a frame structure provided with fixed means forming a stationary tapping station; means for feeding the nuts to be tapped one at a time to the tapping station and so that the bases thereof are at the bottom; a power driven tapping head mounted on the frame structure beneath the tapping station and embodying an upwardly extending rotatable tap directly under the station and automatic tap driving mechanism whereby the tap is driven in one direction for nut tapping purposes when a nut at the station is shifted downwards onto the tap and the tap is reversely driven so as to back off the tapped nut when the nut after a tapping operation is shifted upwards; a tubular nut supporting member located at the tapping station, extending loosely around the tap, mounted for limited down and up sliding movement, provided with spring means for urging it into its up position, and adapted when in its said up position to receive and support the nuts on its upper end as they are fed one at a time to the tapping station by the nut feeding means; an elongated anvil separate from and independent of the tubular member, positioned above the tapping station and in coaxial relation with the tap, mounted for down and up sliding movement towards and away from the tap, provided at its lower end with a continuous series of spaced apart fingers corresponding in number to, and shaped snugly to fit within, the spaces between the flanges and tongues of the nut at the tapping station, adapted during the middle part of its downward sliding movement to have the lower ends of its fingers enter the aforementioned spaces of the nut at the tapping station and during the remainder of its said downward sliding movement to slide the nut and the tubular member downwards against the force of said spring means and around the tap for nut tapping purposes, and further adapted during completion of its upward sliding movement to raise the tapped nut at the station above the tubular member; power means for sliding the anvil downwards and upwards; and means for stripping the tapped nut from the anvil directly before the latter reaches its fully up position.

References Cited in the file of this patent

UNITED STATES PATENTS

| Number | Name | Date |
| --- | --- | --- |
| 1,249,697 | Walker | Dec. 11, 1917 |
| 1,890,495 | Carlson | Dec. 13, 1932 |
| 2,067,267 | Goldberg | Jan. 12, 1937 |
| 2,130,348 | Knettle | Sept. 20, 1938 |
| 2,133,353 | Johnson | Oct. 18, 1938 |
| 2,249,758 | Goldberg | July 22, 1941 |
| 2,310,083 | Holmes | Feb. 2, 1943 |
| 2,388,779 | Boehmler | Nov. 13, 1945 |
| 2,501,738 | Prutton | Mar. 28, 1950 |
| 2,531,395 | Carlson | Nov. 28, 1950 |
| 2,689,667 | Thompson | Sept. 21, 1954 |

FOREIGN PATENTS

| Number | Country | Date |
| --- | --- | --- |
| 561,582 | Great Britain | May 24, 1944 |